US011102803B2

(12) United States Patent
Park et al.

(10) Patent No.: US 11,102,803 B2
(45) Date of Patent: Aug. 24, 2021

(54) APPARATUS AND METHOD FOR UPLINK SCHEDULING IN WIRELESS COMMUNICATION SYSTEM

(71) Applicants:Samsung Electronics Co., Ltd., Suwon-si (KR); Korea University Research and Business Foundation, Seoul (KR)

(72) Inventors: Seunghoon Park, Suwon-si (KR); Chunggu Kang, Seoul (KR); Byounghoon Jung, Suwon-si (KR); Chungkee Kim, Seoul (KR); Chanseok Yang, Seoul (KR); Jungsoo Jung, Suwon-si (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 166 days.

(21) Appl. No.: 16/409,722

(22) Filed: May 10, 2019

(65) Prior Publication Data

US 2019/0349979 A1    Nov. 14, 2019

(30) Foreign Application Priority Data

May 11, 2018  (KR) ........................ 10-2018-0054496

(51) Int. Cl.
*H04W 72/12*  (2009.01)
*H04W 24/10*  (2009.01)
*H04W 16/14*  (2009.01)

(52) U.S. Cl.
CPC ....... *H04W 72/1289* (2013.01); *H04W 16/14* (2013.01); *H04W 24/10* (2013.01); *H04W 72/1226* (2013.01)

(58) Field of Classification Search
None
See application file for complete search history.

(56) References Cited

U.S. PATENT DOCUMENTS

2016/0007350 A1\*  1/2016  Xiong .................. H04W 24/10
                                                        370/252
2016/0330678 A1   11/2016  Yoon et al.
(Continued)

FOREIGN PATENT DOCUMENTS

WO  WO-2018115967 A1 \*  6/2018 ............ H04W 74/08

OTHER PUBLICATIONS

Qualcomm, "New SID on NR-based Access to Unlicensed Spectrum", 3GPP TSG RAN Meeting #75, RP-170828, Mar. 2017, 5 pages.

*Primary Examiner* — Ajit Patel
*Assistant Examiner* — Pamit Kaur

(57) ABSTRACT

The present disclosure is related to a pre-$5^{th}$-Generation (5G) or 5G communication system to be provided for supporting higher data rates beyond $4^{th}$-Generation (4G) communication system such as Long Term Evolution. A method for operating a base station includes transmitting, to a terminal, configuration information for measuring a channel blockage status indicating a degree by which an unlicensed band is occupied by an interference node, receiving information regarding the channel blockage status measured based on the configuration information, transmitting, to the terminal, scheduling information regarding uplink resources generated based on the information regarding the channel blockage status, and receiving data from the terminal based on the scheduling information, wherein the configuration information comprises at least one of information regarding a measurement duration for measuring the channel blockage status, information regarding uplink resources allocated to
(Continued)

measure the channel blockage status, and information regarding a channel occupancy time of the base station.

8 Claims, 28 Drawing Sheets

(56) References Cited

U.S. PATENT DOCUMENTS

| | | | |
|---|---|---|---|
| 2019/0090235 A1* | 3/2019 | Hu | H04W 72/14 |
| 2019/0182866 A1* | 6/2019 | Li | H04W 72/121 |
| 2020/0045735 A1* | 2/2020 | Kim | H04W 52/42 |
| 2020/0170004 A1* | 5/2020 | Si | H04W 72/0413 |
| 2020/0351688 A1* | 11/2020 | Siomina | H04B 17/318 |

* cited by examiner

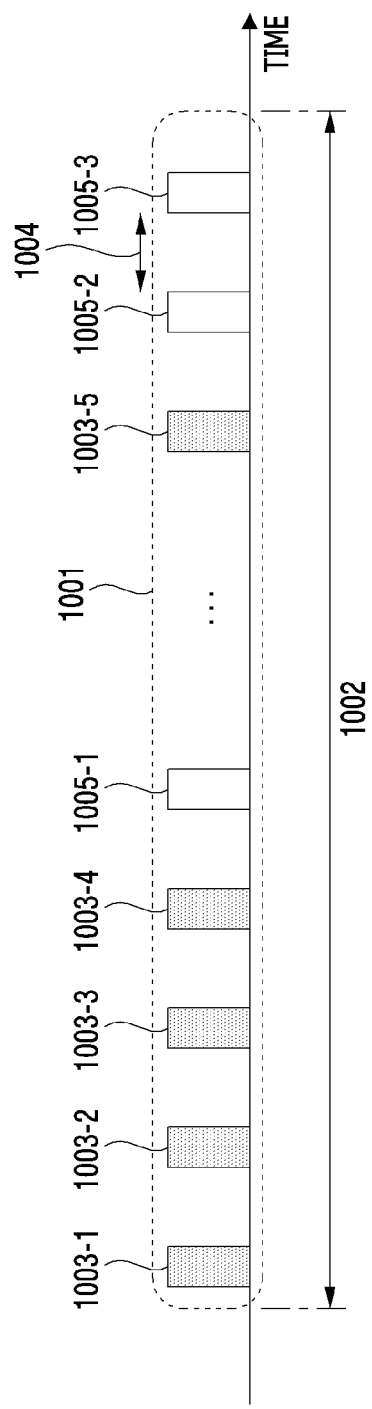

APPARATUS AND METHOD FOR UPLINK SCHEDULING IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0054496, filed on May 11, 2018, in the Korean Intellectual Property Office, the disclosure of which is incorporated by reference herein in its entirety.

BACKGROUND

1. Field

The disclosure generally relates to wireless communication systems, and more particularly to apparatus and methods for uplink scheduling in the wireless communication systems.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A communication system supporting licensed assisted access (LAA) performs a listen before talk (LBT) procedure, for coexistence with a communication system which uses an unlicensed band. If there is no channel occupancy by another node, a terminal transmits uplink data after receiving an uplink grant. However, since an entity which allocates a resource is different from an entity which performs LBT, another node may be able to occupy a channel when uplink data is transmitted in practice, and the terminal may not be able to transmit the uplink data. Accordingly, allocated uplink resources may be wasted.

SUMMARY

The disclosure provides methods and apparatus for effectively performing uplink scheduling in wireless communication systems.

In addition, the disclosure provides methods and apparatus for configuring information to measure a channel blockage status in an unlicensed band.

In addition, the disclosure provides methods and apparatus for measuring a channel blockage status based on information configured in an unlicensed band.

In addition, the disclosure provides methods and apparatus for scheduling an uplink resource based on information regarding a measured channel blockage status.

In addition, the disclosure provides methods and apparatus for measuring a channel blockage status by using duration information.

In addition, the disclosure provides methods and apparatus for measuring a channel blockage status based on an uplink resource configuration.

In addition, the disclosure provides methods and apparatus for measuring a channel blockage status based on a channel occupancy time.

In addition, the disclosure provides methods and apparatus for determining a transmission mode of a terminal.

In addition, the disclosure provides methods and apparatus for performing scheduling by grouping terminals based on a channel blockage status.

According to one or more embodiments of the disclosure, a method for operating a base station in a wireless communication system may include transmitting, to a terminal, configuration information for measuring a channel blockage status indicating a degree by which an unlicensed band is occupied by an interference node, receiving information regarding the channel blockage status measured based on the configuration information, transmitting, to the terminal, scheduling information regarding uplink resources generated based on the information regarding the channel blockage status, and receiving data from the terminal based on the scheduling information. The configuration information may include at least one of information regarding a measurement duration for measuring the channel blockage status, information on uplink resources allocated to measure the channel blockage status, and information regarding a channel occupancy time (COT) of the base station.

According to one or more embodiments of the disclosure, a method for operating a terminal in a wireless communication system may include receiving, from a base station, configuration information for measuring a channel blockage status indicating a degree by which an unlicensed band is occupied by an interference node, measuring the channel blockage status based on the configuration information, transmitting information regarding the measured channel blockage status to the base station, receiving, from the base station, uplink scheduling information generated based on the measured channel blockage status information, and transmitting data to the base station based on the scheduling information. The configuration information may include at least one of information regarding a measurement duration for measuring the channel blockage status, information regarding uplink resources allocated to measure the channel blockage status, and information regarding a COT of the base station.

According to one or more embodiments of the disclosure, a base station in a wireless communication system may include a transceiver, and a processor configured to transmit, to a terminal, configuration information for measuring a channel blockage status indicating a degree by which an unlicensed band is occupied by an interference node, receive information regarding the channel blockage status measured based on the configuration information, transmit, to the terminal, scheduling information regarding uplink resources generated based on the information regarding the channel blockage status, and receive data from the terminal based on the scheduling information. The configuration information may include at least one of information regarding a measurement duration for measuring the channel blockage status, information regarding uplink resources allocated to measure the channel blockage status, and information regarding a COT of the base station.

According to one or more embodiments of the disclosure, a terminal in a wireless communication system may include a transceiver, and a processor configured to receive, from a base station, configuration information for measuring a channel blockage status indicating a degree by which an unlicensed band is occupied by an interference node, measure the channel blockage status based on the configuration information, transmit information regarding the measured channel blockage status to the base station, receive, from the base station, uplink scheduling information generated based on the measured channel blockage status information, and transmit data to the base station based on the scheduling information. The configuration information may include at least one of information regarding a measurement duration for measuring the channel blockage status, information on uplink resources allocated to measure the channel blockage status, and information regarding a COT of the base station.

An apparatus and method according to various embodiments of the disclosure can perform improved uplink scheduling in an unlicensed band by using channel blockage status information measured in a terminal.

BRIEF DESCRIPTION OF THE DRAWINGS

Advantages acquired in the disclosure are not limited to the aforementioned advantages. Other advantages not mentioned herein can be clearly understood by those skilled in the art to which the disclosure pertains from the following descriptions.

FIG. 10A illustrates an example for measuring a channel blockage status in a short-term in a wireless communication system according to various embodiments of the disclosure;

DETAILED DESCRIPTION

Figure 1:
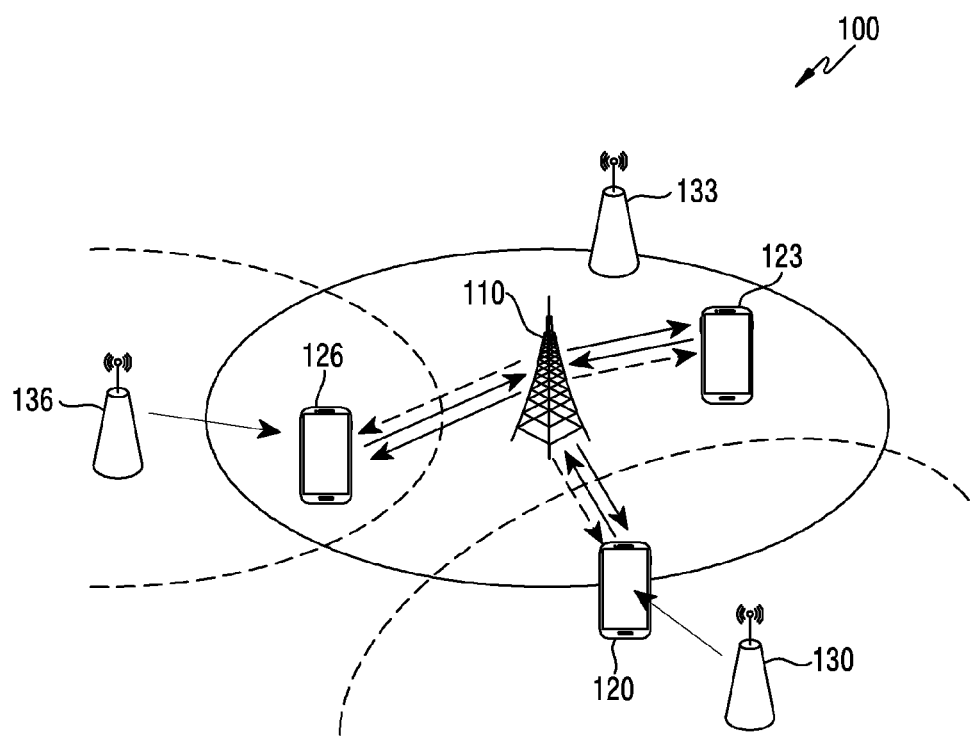
FIG. 1 illustrates an exemplary wireless communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

In this document, the expressions "A or B" or "at least one of A and/or B" and the like may include all possible combinations of the items listed together. Expressions such as "first" or "second" may qualify the components regardless of order or importance, and are used to distinguish one component from another component.

When a component (e.g., first component) is referred to as being "(functionally or communicatively) connected" or "connected to" another component (e.g., second component), it is to be understood that the component may be directly connected to the another component or may be connected through another component (e.g., third component).

Hereinafter, the disclosure relates to an apparatus and methods for uplink scheduling in a wireless communication supporting licensed assisted access (LAA). Specifically, the disclosure describes a technique for scheduling uplink resources based on a measured channel blockage status.

Terms used hereinafter, i.e., a term referring to control information, a term (e.g., a step, an operation) referring to a computation state (e.g., a step, an operation), a term (e.g., information, a value) referring to data, a term (e.g., a base station, gNB, a central unit (CU), a distributed unit (DU), a radio unit (RU)) referring to a network entity, signaling, uplink bursts, and downlink bursts, a term (e.g., feedback, a signal, data) referring to messages, a term referring to a component of a device, and the like are exemplified for convenience of explanation. Therefore, the disclosure is not limited to the terms described below, and thus other terms having the same technical meaning may also be used.

In addition, although the disclosure also describes various embodiments by using terms used in some communication standards (e.g., $3^{rd}$ generation partnership project (3GPP)), this is for exemplary purposes only. Various embodiments of the disclosure may be easily modified, and thus may also be applied to other communication systems.

In order for a terminal to perform uplink transmission in an unlicensed band, the terminal may identify whether a current channel is busy or idle through a listen before talk (LBT) procedure. In this case, if the LBT has failed since a channel of the terminal is busy, the terminal cannot use a resource allocated from a base station. Therefore, for effective uplink scheduling, the base station may acquire information regarding a channel occupancy state of each terminal, and may determine to which terminal and by which scheme a resource will be allocated based on the acquired information. In general, the terminal may identify whether the channel is busy or idle through a clear channel assessment (CCA) procedure. That is, the terminal may measure a channel blockage status indicating a degree by which a current channel is occupied by an interference source, and may convert it into a predetermined value of 0 (idle) or 1 (busy) and report this to the base station. However, there may be a time difference between a time point at which the terminal performs CCA and a time point at which uplink LBT is performed for uplink transmission. Therefore, at the time point at which the terminal performs uplink LBT, a probability that the channel is occupied by the interference source may be expressed by a probability value in the range of 0 to 1, instead of 0 or 1. Accordingly, in order for the base station to effectively perform uplink scheduling, each terminal has to be capable of measuring the channel blockage status in the range of 0 to 1, instead of a binary value of 0 or 1. In some embodiments, when the terminal measures the channel blockage status, a moment at which the base station provides a CCA opportunity to the terminal to measure the channel blockage status is a time point at which the terminal attempts uplink LBT to use an allocated uplink resource. Therefore, the channel blockage status measurement of the terminal may be performed limitedly or discontinuously. As such, when the channel blockage status measurement is performed limitedly or discontinuously, the base station cannot effectively allocate the uplink resource. Accordingly, in other embodiments, the base station may allocate CCA slots to perform additional channel blockage status measurement, in addition to the channel blockage status measurement in an uplink resource allocated to the terminal.

The disclosure relates to an apparatus and method in which a channel blockage status is measured by using a variety of configuration information which is used to effectively schedule uplink resources, in order to solve the aforementioned problem in the channel blockage status measurement.

FIG. 1 illustrates an exemplary wireless communication system according to various embodiments of the disclosure.

Referring to FIG. 1, the wireless communication system 100 may include a base station 110, a terminal 120, and a node 130. In the following description, for convenience of explanation, a base station operating in a licensed band and a base station operating in an unlicensed band are described distinctively. However, this is for exemplary purposes only for distinguishing operations in concept, and the disclosure is not limited thereto. In other words, in practice, one base station may perform both the operation in the licensed band and the operation in the unlicensed band.

The base station 110 is a network infrastructure which provides a radio access to the terminal in a coverage. The coverage may be defined as a specific geographic region based on a distance in which the base station 110 can transmit a signal. The base station 110 may provide a service to terminals (e.g., terminals 120, 123, and 126) in the coverage (or cell). Herein, in addition to the term 'base station', the base station may be referred to as an 'access point (AP)', an 'eNodeB (eNB)', a '5th generation (5G) node', a '5G NodeB (gNB)', a 'wireless point', a 'transmission/reception point (TRP)', a ' distributed unit (DU)', a 'Radio unit (RU)', a 'remote radio head (RRH), or other terms having equivalent technical meanings. The base station 110 may perform communication with at least one terminal in the coverage.

As a device used by a user, the terminal 120 communicates with the base station 110 through a wireless channel. Optionally, at least one of the terminals, i.e., the terminal 120, may operate without user involvement. For example, as a device for performing machine type communication (MTC), the terminal 120 may not be carried by the user. Herein, in addition to the term 'terminal', the terminal 120 may be referred to as a 'user equipment (UE)', a 'mobile station', a 'subscriber station', a 'remote terminal', a 'wireless terminal', an electronic device', a 'user device', or other terms having equivalent technical meanings. The terminal (e.g., the terminal 120) according to various embodiments of the disclosure may include, for example, at least one of a smart phone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a medical device, a camera, and a wearable device. Although the description on the terminal has focused on the terminal 120, it is also applicable to the terminal 123 and the terminal 126.

The node 130 may provide radio access to the terminal in the coverage of the unlicensed band. The node 130 may support a communication service which can operate in the unlicensed band. For example, the node 130 may be a device supporting wireless fidelity (Wi-Fi). For another example, the node 130 may be a device supporting a wireless local area network (WLAN). For another example, the node 130 may be a device supporting Bluetooth. Herein, although an AP supporting a Wi-Fi communication system is exemplified as the node 130 for convenience of explanation, the disclosure is not limited thereto. Although the description on the node operating in the unlicensed band has focused on the node 130, the description is also applicable to the node 133 and the node 136.

The wireless communication system 100 may include the base station 110, the terminal 120, the terminal 123, the terminal 126, and a node 133. A situation is described in which the base station 110 is located out of each coverage of the node 130 and a node 136. In addition, a situation is described in which the terminal 120 is adjacent to the node 130, the terminal 123 is adjacent to the node 133, and the terminal 126 is adjacent to the node 136.

The wireless communication system 100 may be in a wireless environment in which a licensed band and an unlicensed band coexist. The base station 110 and the terminal 120 may be a device supporting LAA. The base station 110 and the terminal 120 may occupy a channel after performing an LBT procedure for the coexistence with the node 130 operating in the unlicensed band. Hereinafter, a channel as an object for determining whether the channel is busy implies a channel of the unlicensed band. Through the LBT procedure, the base station 110 may identify that the channel of the unlicensed band is not busy. The base station 110 may determine a maximum channel occupancy time (COT) for occupying the unlicensed band. Herein, the maximum COT implies a maximum value of time allocated such that the base station 110 and the terminal 120 perform uplink data transmission and downlink data transmission through the unlicensed band. The base station 110 may allocate downlink resources for downlink transmission. The base station 110 may allocate uplink resources to a terminal (e.g., the terminal 120) requiring uplink transmission. The base station 110 may transmit downlink data to the terminal 120 during the COT through the downlink resources. The base station 110 may prevent neighboring nodes of the base station 110 from occupying the unlicensed band channel during the downlink data is transmitted.

The terminal 120 may identify whether a neighboring node of the terminal 120 occupies a channel, before uplink data is transmitted. If it is determined that the neighboring node of the terminal 120 does not occupy the channel, the terminal 120 may transmit uplink data to the base station 110 through allocated uplink resources. On the other hand, when the terminal 120 transmits the uplink data through the unlicensed band, a situation may occur in which the node 130 occupies the unlicensed band. The terminal 120 may not perform uplink data transmission since a channel of the unlicensed band is currently busy. In this case, the uplink resources allocated by the base station 110 to the terminal 120 is not used. In other words, the uplink resource is wasted.

Hereinafter, a configuration of the base station 110 and a configuration of the terminal 120 are described separately to perform scheduling based on a channel blockage status with reference to FIG. 2 and FIG. 3.

Figure 2:
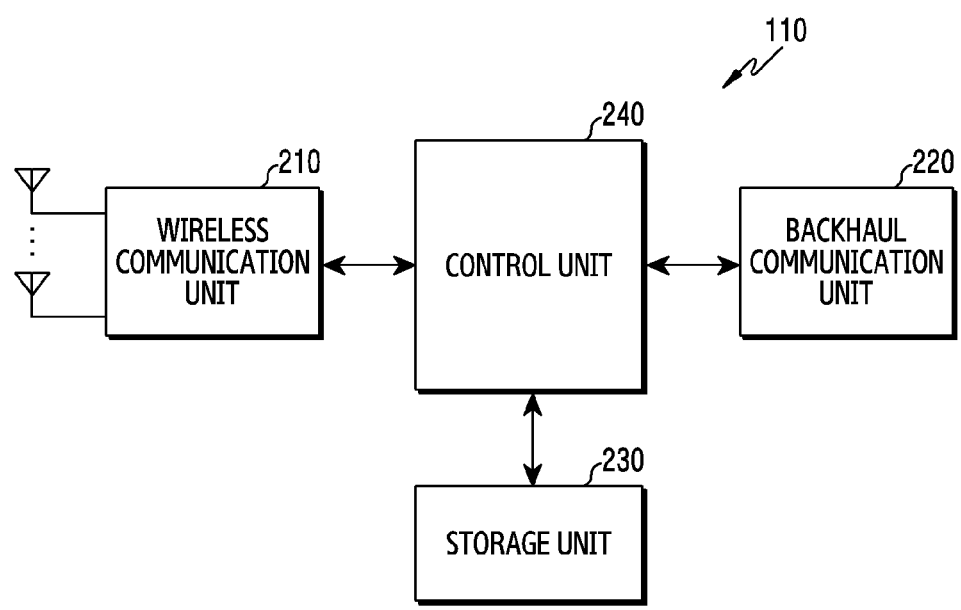
FIG. 2 illustrates an exemplary configuration of a base station in a wireless communication system according to various embodiments of the disclosure.

FIG. 2 illustrates an exemplary configuration of the base station 110 in a wireless communication system according to various embodiments of the disclosure. The configuration exemplified in FIG. 2 may be understood as a configuration of the base station 110. Hereinafter, the term ' . . . unit', ' . . . device', or the like implies a unit of processing at least one function or operation, and may be implemented in hardware or software or in combination of the hardware and the software.

Referring to FIG. 2, the base station 110 includes a wireless communication unit 210, a backhaul communication unit 220, a storage unit 230, and a control unit 240. The wireless communication unit 210 performs functions for transmitting and receiving a signal through a wireless channel. For example, the wireless communication unit 210 performs a function of conversion between a baseband signal and a bit-stream according to a physical layer standard of a system. For example, in data transmission, the wireless communication unit 210 generates complex symbols by coding and modulating a transmission bit-stream. In addition, in data reception, the wireless communication unit 210 restores a reception bit-stream by demodulating and decoding a baseband signal. In addition, the wireless communication unit 210 up-converts a baseband signal into a radio frequency (RF) signal and thereafter transmits it through an antenna, and down-converts an RF signal received through the antenna into a baseband signal.

For this, the wireless communication unit 210 may include a transmission filter, a reception filter, an amplifier, a mixer, an oscillator, a digital to analog converter (DAC), an analog to digital converter (ADC), or the like. In addition, the wireless communication unit 210 may include a plurality of transmission/reception paths. Further, the wireless communication unit 210 may include at least one antenna array constructed of a plurality of antenna elements. From a hardware aspect, the wireless communication unit 210 may be constructed of a digital unit and an analog unit, and the analog unit may be constructed of a plurality of sub-units according to operating power, operation frequency, or the like.

The wireless communication unit 210 transmits and receives a signal as described above. Accordingly, the wireless communication unit 210 may be referred to as a transmitter, a receiver, or a transceiver. In addition, in the following description, transmission and reception performed through a wireless channel are used to imply that the aforementioned processing is performed by the wireless communication unit 210.

The wireless communication unit 210 may transmit/receive a signal in a licensed band. The licensed band implies a communication band which is allocated to a specific network operator so that a service is provided from the operator. In addition, the wireless communication unit 210 may transmit/receive a signal in an unlicensed band. The unlicensed band implies a communication band (e.g., 5 GHz) that can be used without a permission of the network operator. The wireless communication unit 210 may perform carrier aggregation (CA). The CA may be performed by setting a carrier of the licensed band as a primary component carrier (PCC) and by setting a carrier of the unlicensed band as a secondary component carrier (SCC).

The backhaul communication unit 220 provides an interface for preforming communication with different nodes in a network. That is, the backhaul communication unit 220 converts a bit-stream transmitted from the base station 110 to a different node, e.g., a different access node, a different base station, an upper node, a core network, or the like, into a physical signal, and converts a physical signal received from the different node into a bit-stream. Meanwhile, although it is described that the base station 110 operates in both the licensed band and the unlicensed band in the disclosure, it is also possible that the base station 110 operates in the licensed band and another base station operates in the unlicensed band. The base station 110 may control an unlicensed band operation of a different base station through the backhaul communication unit 220. For example, the base station 110 may control the different base station so that the different base station transmits control information including an uplink grant to the terminal 120.

The storage unit 230 stores data such as a basic program, application program, configuration information, or the like for an operation of the base station 110. The storage unit 230 may be constructed of a volatile memory, a non-volatile memory, or a combination of the volatile memory and the non-volatile memory. In addition, the storage unit 230 provides the stored data according to a request of the control unit 240.

The control unit 240 controls overall operations of the base station 110. For example, the control unit 240 may transmit and receive a signal via the wireless communication unit 210 or the backhaul communication unit 220. In addition, the control unit 240 writes data to the storage unit 230, and reads the data. Further, the control unit 240 may perform functions of a protocol stack required in a communication standard. For this, the control unit 240 may include at least one processor. According to various embodiments, the control unit 240 may include a scheduler. The scheduler may allocate a resource for downlink transmission. In addition, the scheduler may allocate a resource for uplink transmission. As an instruction set or code stored in the storage unit 230, the scheduler may be a storage space in which the instruction/code is stored as an instruction/code temporarily resided in the control unit 240, or may be part of a circuitry which constitutes the control unit 240. For example, the control unit 240 may control the base station 110 to perform operations according to various embodiments described below.

Figure 3:
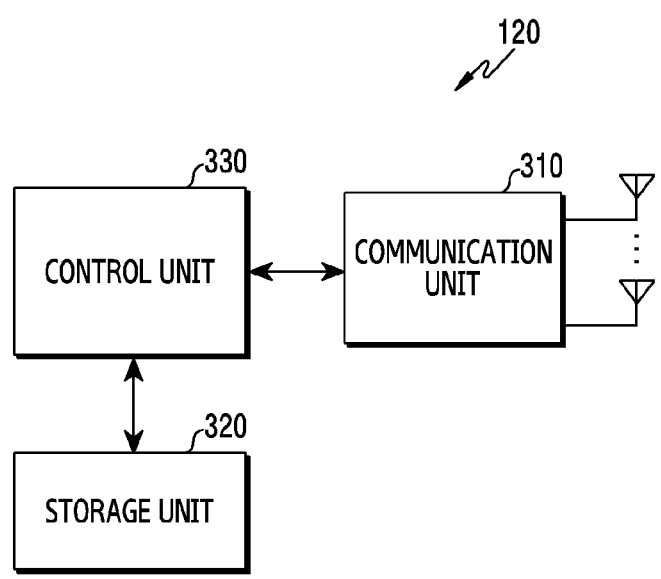
FIG. 3 illustrates an exemplary configuration of a terminal in a wireless communication system according to various embodiments of the disclosure.

FIG. 3 illustrates an exemplary configuration of the terminal 120 in a wireless communication system according to various embodiments of the disclosure. The configuration exemplified in FIG. 3 may be understood as a configuration of the terminal 120. Hereinafter, the term ' . . . unit', ' . . . device', or the like implies a unit of processing at least one function or operation, and may be implemented in hardware or software or in combination of the hardware and the software.

Referring to FIG. 3, the terminal 120 includes a communication unit 310, a storage unit 320, and a control unit 330. The communication unit 310 performs functions for transmitting and receiving a signal through a wireless channel. For example, the communication unit 310 performs a function of conversion between a baseband signal and a bit-stream according to a physical layer standard of a system. For example, in data transmission, the communication unit 310 generates complex symbols by coding and modulating a transmission bit-stream. In addition, in data reception, the communication unit 310 restores a reception bit-stream by demodulating and decoding a baseband signal. In addition, the communication unit 310 up-converts a baseband signal into a RF signal and thereafter transmits it through an antenna, and down-converts an RF signal received through the antenna into a baseband signal. For example, the communication unit 310 may include a transmission filter, a reception filter, an amplifier, a mixer, an oscillator, a DAC, an ADC, or the like.

In addition, the communication unit 310 may include a plurality of transmission/reception paths. Further, the communication unit 310 may include at least one antenna array constructed of a plurality of antenna elements. From a hardware aspect, the communication unit 310 may be constructed of a digital circuit and an analog circuit (e.g., a radio frequency integrated circuit (RFIC)). Herein, the digital and the analog circuit may be implemented as one package. In addition, the communication unit 310 may include a plurality of RF chains. Further, the communication unit 310 may perform beamforming.

In addition, the communication unit 310 may include different communication modules to process signals of different frequency bands. The communication unit 310 may include a communication module for processing signals of a licensed band. For example, the communication unit 310 may include a communication module for accessing a cellular network of an LTE communication system. Further, the communication unit 310 may include a communication module for processing signals of an unlicensed band. For example, the communication unit 310 may include a bluetooth low energy (BLE) module, a Wi-Fi module, a WiFi Gigabyte (WiGig) module, or the like. The communication unit 310 may include the aforementioned plurality of modules to support a plurality of radio access technologies (RATs) different from each other. In addition, the different frequency bands may include a super high frequency (SHF) (e.g., 2.5 GHz, 5 Ghz) band and a millimeter (mm) wave (e.g., 60 GHz) band.

The communication unit 310 transmits and receives a signal as described above. Accordingly, the communication unit 310 may be referred to as a transmitter, a receiver, or a transceiver. In addition, in the following description, transmission and reception performed through a wireless channel are used to imply that the aforementioned processing is performed by the communication unit 310.

The storage unit 320 stores data such as a basic program, application program, configuration information, or the like for an operation of the terminal 120. The storage unit 320 may be constructed of a volatile memory, a non-volatile memory, or a combination of the volatile memory and the non-volatile memory. In addition, the storage unit 320 provides the stored data according to a request of the control unit 330. The storage unit 320 may include a buffer. According to various embodiment, the storage unit 320 may store a plurality of transport blocks generated by the control unit 330.

The control unit 330 controls overall operations of the terminal 120. For example, the control unit 330 may transmit and receive a signal via the communication unit 310. In addition, the control unit 330 writes data to the storage unit 320, and reads the data. Further, the control unit 330 may perform functions of a protocol stack required in a communication standard. For this, the control unit 330 may include at least one processor or micro-processor, or may be part of the processor. In addition, part of the communication unit 310 and the control unit 330 may be referred to as a communication processor (CP). In particular, according to various embodiments, the control unit 330 may generate a transport block according to control information received from the base station 110, and controls the generated transport block to be mapped to an allocated uplink resource. For example, the control unit 330 may control the terminal to perform operations according to various embodiments described below.

Figure 4:
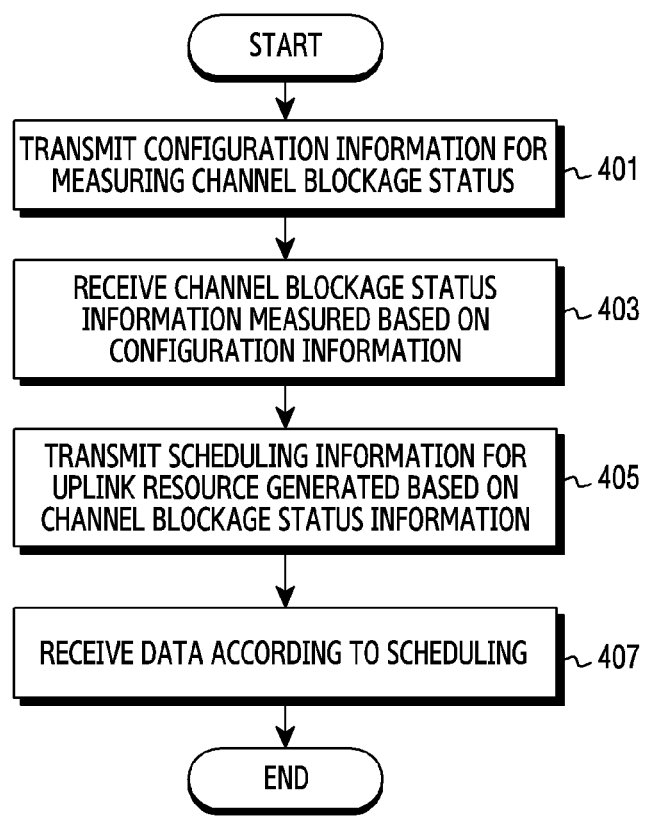
FIG. 4 is an exemplary flowchart of a base station for receiving channel blockage status information measured based on configuration information in a wireless communication system and transmitting uplink scheduling information generated based on the channel blockage status information according to various embodiments of the disclosure.

FIG. 4 is an exemplary flowchart of a base station for receiving channel blockage status information measured based on configuration information in a wireless communication system and transmitting uplink scheduling information generated based on the channel blockage status information according to various embodiments of the disclosure. One method of operating the base station 110 of FIG. 1 is exemplified in FIG. 4.

Referring to FIG. 4, in step 401, the base station transmits configuration information for measuring a channel blockage status. In some embodiments, the channel blockage status may imply a degree or probability that at least one given slot is occupied by an interference source. The channel blockage status may be referred to as an uplink clear channel assessment blockage status (UCBS). The base station may transmit a variety of configuration information to a terminal so that the terminal uses the information to measure the channel blockage status. For example, the configuration information may include measurement window information including at least one slot for measuring the channel blockage status, duration information for long-term or short-term measurement, punctured resource or unpunctured resource information, information on a resource in unit of a cell or a cell group, and channel occupancy time (COT) information. The base station may transmit configuration information including at least one of the aforementioned items to the terminal to measure the channel blockage status.

In step 403, the base station receives channel blockage status information measured based on the configuration information. That is, the base station may receive, from the terminal, channel blockage status information measured by the terminal. In some embodiments, the channel blockage status may be measured based on duration information. In other embodiments, the channel blockage status may be measured based on resource configuration information. In other embodiments, the channel blockage status may be measured in a duration included in the COT or a duration not included in the COT. In some embodiments, the base station may receive not only the channel blockage status information but also information regarding channel blockage status measurement timing of the terminal.

In step 405, the base station transmits scheduling information for uplink resources generated based on the channel blockage status information. For this, the base station may classify values indicating the channel blockage status information received from the terminal and perform scheduling by using the classified values. In this case, the base station may classify values based on the configuration information transmitted to the terminal or based on additional information included in the channel blockage status information received from the terminal or a structure of the channel blockage status information. In some embodiments, the base station may group the terminals for uplink resource scheduling. For example, the base station may allocate terminals belonging to an unlicensed band to a licensed band based on the received channel blockage status information. In addition, the base station may determine a transmission mode of the terminal based on the channel blockage status information, and may group the terminals according to the transmission mode. After grouping the terminals, the base station may perform scheduling for each group so that uplink resource efficiency is maximized.

In step 407, the base station receives data according to the scheduling. That is, the base station may receive data from the terminal in a scheduled uplink resources based on the channel blockage status information. In this case, according to a type of scheduling, the base station may receive uplink data one time after scheduling information is transmitted one time, or may repeatedly receive the uplink data.

Figure 5:
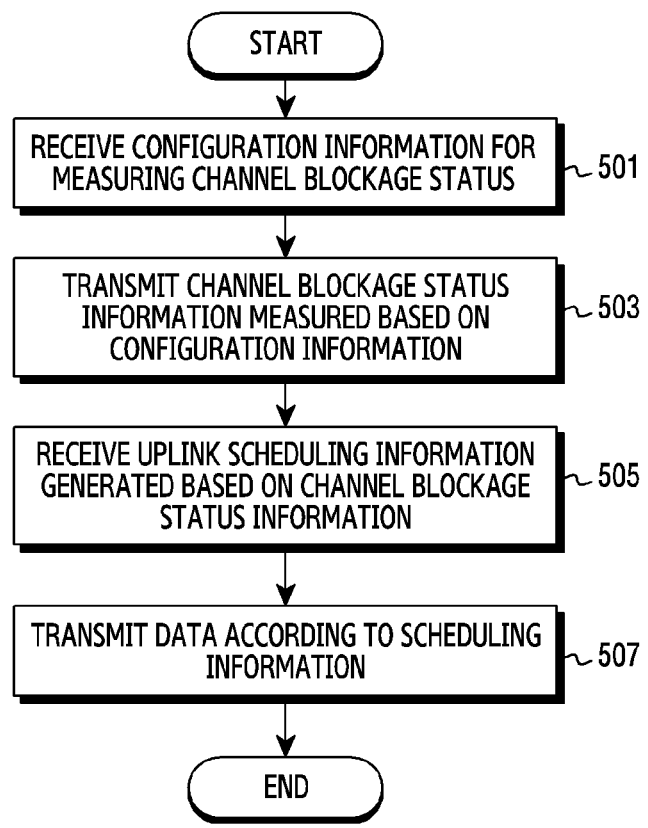
FIG. 5 is an exemplary flowchart of a terminal for transmitting channel blockage status information measured based on configuration information in a wireless communication system and receiving uplink scheduling information generated based on the channel blockage status information according to various embodiments of the disclosure.

FIG. 5 is an exemplary flowchart of a terminal for transmitting channel blockage status information measured based on configuration information in a wireless communication system and receiving uplink scheduling information generated based on the channel blockage status information according to various embodiments of the disclosure. One method of operating the terminal 120 of FIG. 1 is exemplified in FIG. 5.

Referring to FIG. 5, in step 501, the terminal receives configuration information for measuring a channel blockage status. For example, the configuration information may include measurement window information for measuring the channel blockage status, duration information for long-term or short-term measurement, information on punctured resources or unpunctured resources, information on a resource in unit of a cell or a cell group, and COT information. The terminal may receive at least one of the aforementioned configuration information from the base station.

In step 503, the terminal transmits channel blockage status information measured based on the configuration information. In some embodiments, the terminal may measure the channel blockage status based on the configuration information received from the base station. For example, the terminal may measure the channel blockage status based on duration information, may measure the channel blockage status based on resource configuration information, and may measure the channel blockage status during a duration included in the COT or a duration not included in the COT. The terminal may transmit the measured channel blockage status information to the base station. In some embodiments, the terminal may transmit not only the channel blockage status information but also information regarding channel blockage status measurement timing of the terminal.

In step 505, the terminal receives uplink scheduling information generated based on the channel blockage status information. In some embodiments, the scheduling information may include location information indicating locations of resource blocks to be used in an allocated system bandwidth. The terminal may identify the locations of the resource blocks through the location information. In other embodiments, the scheduling information may include information regarding a scheme by which the terminal performs uplink transmission. For example, the scheme may include a scheduled uplink (SUL) transmission scheme or an autonomous uplink (AUL) transmission scheme. In other embodiments, the scheduling information may include information regarding an AUL resources allocated by the base station. For example, the AUL resources may include an AUL transmission cycle or frequency resources. Herein, the AUL resources may be time or frequency resources allocated semi-persistently to maximize resource utility efficiency.

In step 507, the terminal transmits data according to scheduling. That is, the terminal may transmit data to the base station in scheduled uplink resources based on the channel blockage status information. In this case, according to a type of scheduling, the terminal may transmit uplink data one time after scheduling information is received one time, or may repeatedly transmit the uplink data.

In the aforementioned embodiments, the uplink transmission scheme of the terminal may vary depending on the type of scheduling of the base station. Hereinafter, FIG. 6A and FIG. 6B illustrate an example of a scheme by which the terminal performs uplink transmission.

Figure 6A:
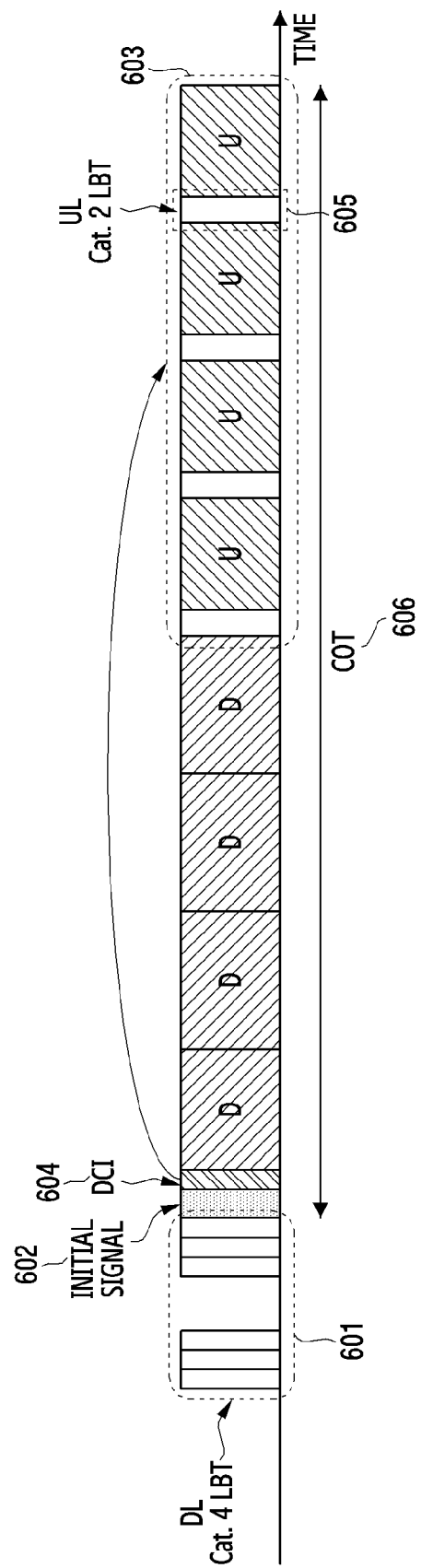
FIG. 6A illustrates an example of scheduled uplink (SUL) transmission in a wireless communication system according to various embodiments of the disclosure.
Figure 6B:
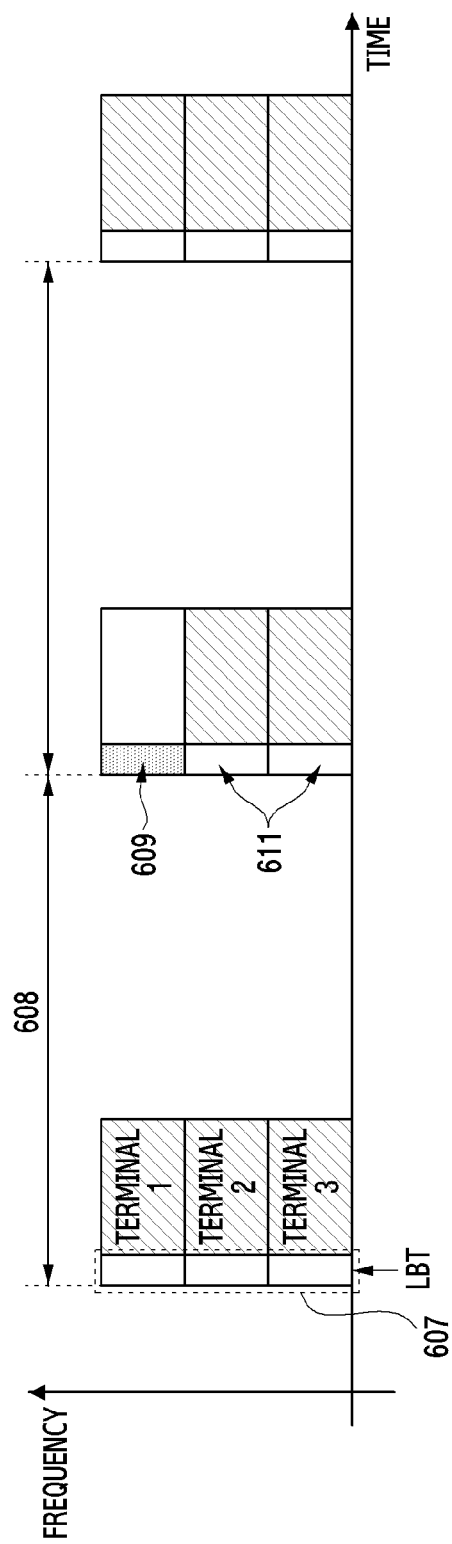
FIG. 6B illustrates an example of autonomous uplink (AUL) transmission in a wireless communication system according to various embodiments of the disclosure.

FIG. 6A illustrates an example of SUL transmission in a wireless communication system according to various embodiments of the disclosure.

Referring to FIG. 6A, although not shown in FIG. 6A, a terminal may transmit a scheduling request (SR) to a base station after performing uplink LBT to allocate uplink resources. The base station which has received the SR may perform downlink LBT in a resource area 601. In an embodiment, the downlink LBT may be performed according to a scheme of performing LBT (e.g., category-4 LBT) through random backoff in a contention window having a variable size. The base station may perform the downlink LBT and transmit an initial signal 602, and thereafter may transmit downlink control information (DCI) 604 including an uplink grant to the terminal. The uplink grant indicates allocated uplink resources 603.

The terminal which has received the uplink grant may perform uplink LBT in a resource area 605 to occupy the allocated uplink resources 603. In an embodiment, the uplink LBT may be performed according to a scheme of performing LBT (e.g., category-2 LBT) without random backoff. The terminal which has performed the uplink LBT may transmit data in the allocated uplink resources 603. In some embodiments, the uplink resource for each terminal may be allocated during a COT 606 after downlink LBT performed by the base station. In other words, the uplink resources for each terminal may be included in the COT duration.

As described above, the scheme of transmitting uplink data through the uplink LBT procedure of the terminal after the downlink LBT procedure of the base station may be defined as scheduled uplink transmission. In some embodiments, a channel access delay may occur in the scheduled uplink transmission scheme since downlink LBT of the base station and uplink LBT of the terminal are frequently performed. In order to overcome a disadvantage of the scheduled uplink transmission scheme, the base station may perform scheduling such that the terminal transmits data through an AUL transmission scheme described below.

FIG. 6B illustrates an example of AUL transmission in a wireless communication system according to various embodiments of the disclosure.

Referring to FIG. 6B, a base station may allocate a semi-persistent time resource through radio resource control (RRC) signaling. In addition, the base station may indicate a frequency resource and a modulation and coding scheme (MCS) through DCI, or may indicate AUL resource activation or inactivation of a terminal. That is, similar to the scheduled uplink transmission, the base station may cyclically allocate predetermined fixed resources instead of performing a complex procedure to allocate an uplink transmission to the terminal. In FIG. 6B, information on a cycle 608 of resources allocated for autonomous uplink transmission may be transmitted one time from the base station to the terminal or may be transmitted repeatedly. The terminal may perform LBT in a resource area 607 in each transmission cycle, and thus may identify a case 609 where a channel is busy and a case 611 where the channel is idle.

As described above, since the base station cyclically allocates predetermined resources to the terminal, the terminal may define an uplink data transmission scheme as autonomous uplink transmission. The base station may schedule uplink resources of the terminal according to the aforementioned scheduled uplink transmission scheme or autonomous uplink transmission scheme, and each of the terminals may transmit data through uplink resources allocated according to each scheme. Upon determining the autonomous uplink transmission scheme, the base station may allocate time and frequency resources to the terminals semi-persistently. Thereafter, an additional scheduling procedure or signaling related to a scheduling request is not required. Therefore, the autonomous uplink transmission scheme may be a transmission scheme suitable when the base station properly groups the terminals and uses resource through overloading for the same resources.

Various embodiments according to the disclosure may be implemented through an uplink access system in which both time and frequency resources are allocated by the base station based on the aforementioned scheduling schemes. Herein, the uplink access system may include a scheduled uplink transmission scheme by which resources are allocated dynamically and an autonomous uplink transmission scheme by which resources are allocated semi-persistently. In addition, the scheduling-based uplink access system may consider that channel access is performed through LBT in allocated resources. In case of the scheduling-based uplink access system, data transmission may be performed only after LBT is performed in the base station or the terminal, that is, after CCA is performed. However, since uplink resources are allocated by the base station and uplink transmission is performed by the terminal, a target for allocating resources and a target for using resources are not matched to each other, which may lead to uplink channel blockage of the terminal. Hereinafter, FIG. 7 illustrates a case where uplink channel blockage occurs.

Figure 7:
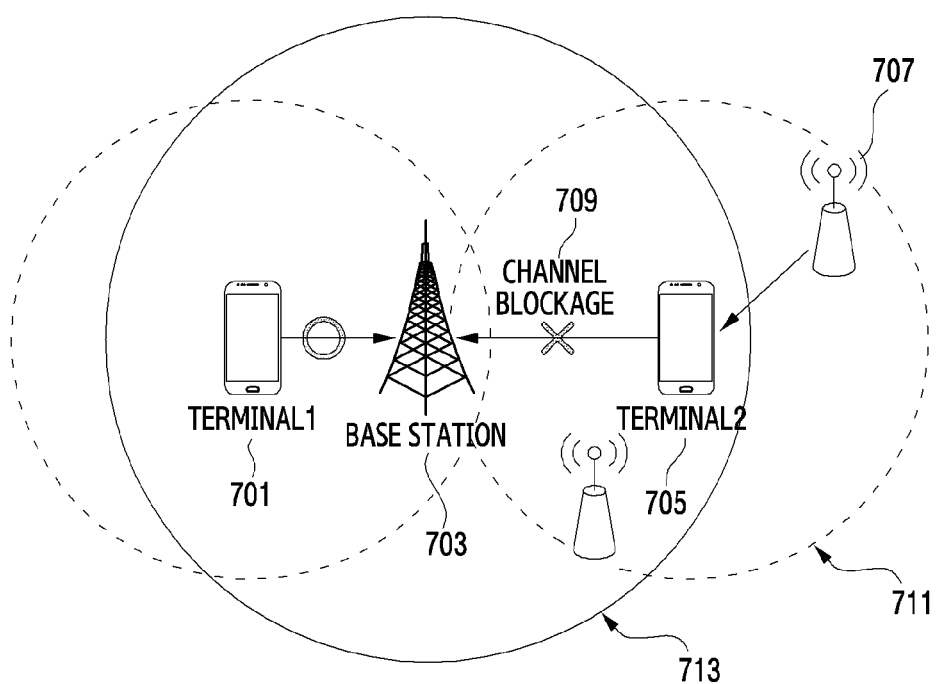
FIG. 7 illustrates an example in which a channel blockage status occurs in a wireless communication system according to various embodiments of the disclosure.

FIG. 7 illustrates an example in which a channel blockage status occurs in a wireless communication system according to various embodiments of the disclosure.

Referring to FIG. 7, a base station 703 may perform channel detection according to downlink LBT (e.g., category-4 LBT) to occupy a COT. In this case, an area in which the base station performs channel detection during a time duration allocated for a downlink LBT operation may be defined as a detection area (e.g., a clearing area or a sensing area). For example, the base station 703 performs channel detection according to downlink LBT during a time duration allocated to occupy the COT. If a channel is not occupied by an interference source in a detection area 713 of the base station, the base station 703 may allocate resources to a terminal 1 701 and a terminal 2 705. However, channel blockage caused by the interference source may occur when the terminal 2 705 performs uplink transmission over the allocated resources. Specifically, an area in which the terminal performs channel detection during a time duration allocated for an uplink LBT (e.g., category-2 LBT) operation of the terminal 2 705 may be defined as a detection area of the terminal. For example, the terminal 2 705 may detect whether there is an interference source in a detection area 711 of the terminal 2 705. In this case, if a sensed node 707 is receiving a signal, the terminal 2 705 cannot perform uplink transmission over the allocated resources. As such, when the terminal 2 705 cannot perform uplink transmission in the allocated resource due to the interference source (e.g., the node 707), it may be regarded that channel blockage occurs. Since uplink resources may be wasted due to the channel blockage, the base station may need to know an uplink channel blockage status of the terminal for improved uplink scheduling. Accordingly, the terminal needs to measure the channel blockage status, and the base station needs to receive the measured channel blockage status.

Hereinafter, FIG. 8 to FIG. 15 illustrate configuration information configured by a base station to measure a channel blockage status of a terminal and a method of operating a terminal which measures a channel blockage status by using the configuration information.

Figure 8:
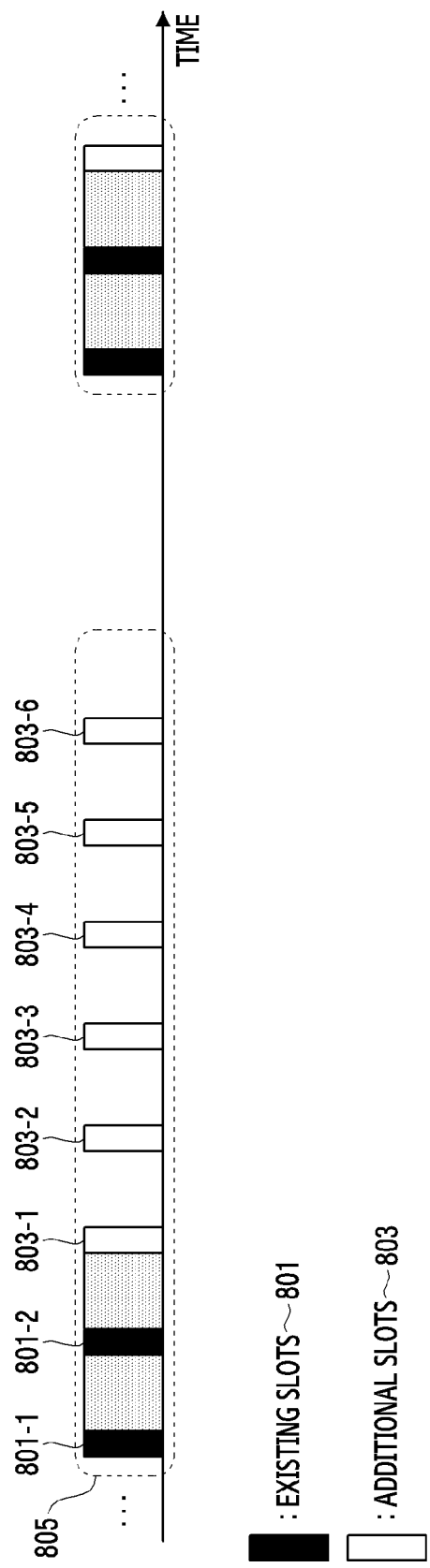
FIG. 8 illustrates a channel blockage status measurement window in a wireless communication system according to various embodiments of the disclosure.

FIG. 8 illustrates a channel blockage status measurement window in a wireless communication system according to various embodiments of the disclosure.

Referring to FIG. 8, in general, since a terminal is capable of measure a channel blockage status in order to only use scheduled uplink resources, an opportunity for measuring the channel blockage status of the terminal may be insufficient. Therefore, a base station may configure a channel blockage status measurement window 805 including additional slots 803-1 to 803-6 in addition to the existing slots 801-1 to 801-2, and may provide information on the channel blockage status measurement window 805 to the terminal. The terminal which has received the information on the channel blockage status measurement window 805 may measure a channel blockage status more accurately by measuring the channel blockage status in the existing slots 801-1 to 801-2 and the additional slots 803-1 to 803-6. In some embodiments, the channel blockage status measurement window may be configured through UE-specific RRC signaling. In addition, the base station may trigger or stop the channel blockage status measurement of the terminal through UE-specific DCI.

In the disclosure, the terminal may measure the channel blockage status in a long-term or short-term for channel blockage status measurement. Hereinafter, FIG. 9A and FIG. 9B illustrate examples in which a terminal measures a channel blockage status in a long-term and a short-term.

Figure 9A:
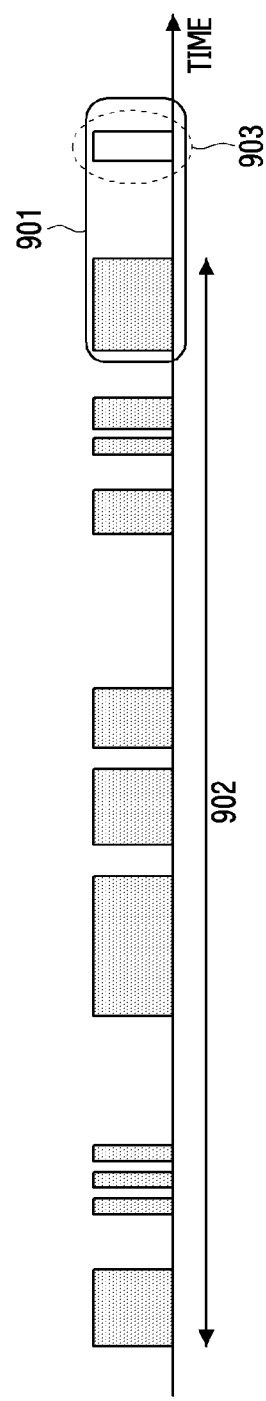
FIG. 9A illustrates an example of measuring a channel blockage status in a long-term in a wireless communication system according to various embodiments of the disclosure.

FIG. 9A illustrates an example of measuring a channel blockage status in a long-term in a wireless communication system according to various embodiments of the disclosure.

Referring to FIG. 9A, a base station may configure a measurement duration such as a long-term and a short-term to measure a channel blockage status of a terminal, and may transmit information regarding the configured measurement duration to the terminal. In some embodiments, the information regarding the measurement duration may be transmitted to the terminal through RRC signaling. The terminal may measure the channel blockage status in a long-term 902 during the measurement duration. A channel blockage status P1 measured in the long-term 902 indicates how frequently a channel is occupied during a long-term by density or traffic patterns or the like of an interference source, and may be determined by accumulating channel blockage status information measured during the long-term 902. In some embodiments, a channel blockage status in any slot 903 may be determined based on at least one of channel blockage status information measured in the long-term and channel blockage status information measured in a short-term to be described below.

Figure 9B:
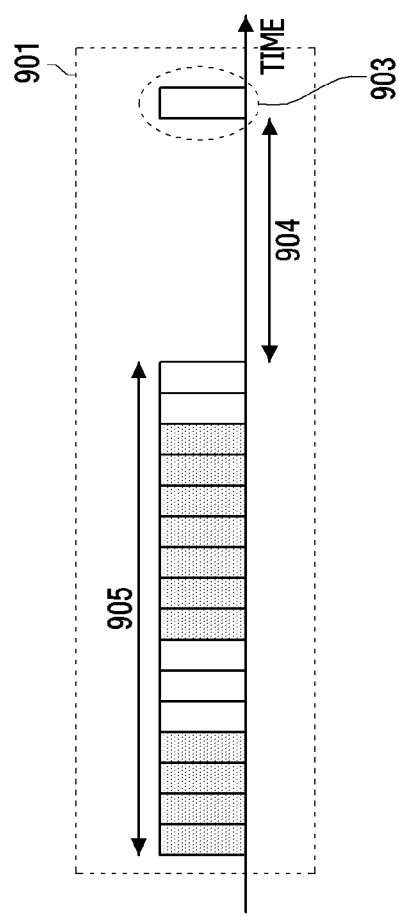
FIG. 9B illustrates an example of measuring a channel blockage status in a short-term in a wireless communication system according to various embodiments of the disclosure.

FIG. 9B illustrates an example of measuring a channel blockage status in a short-term in a wireless communication system according to various embodiments of the disclosure.

Referring to FIG. 9B, a base station may configure a measurement duration such as a long-term and a short-term to measure a channel blockage status of a terminal, and may transmit information regarding the configured measurement duration to the terminal. In some embodiments, the information regarding the measurement duration may be transmitted to the terminal through RRC signaling. The terminal may measure the channel blockage status in a short-term 905 during the measurement duration. The channel blockage status P2 measured in the short-term 905 indicates whether an interference source is currently in an active state, that is, whether traffic exists in a buffer of the interference source, and may be determined based on the channel blockage status information measured during the short-term 905. In some embodiments, the channel blockage status may be determined based on at least one of the channel blockage status information measured in the long-term or the channel state measured in the short-term. In some embodiments, the channel blockage status may be measured during the short-term 905, and an uplink resource may be allocated by the base station based on the measured channel blockage status. In this case, there is a time difference 904 between a time point at which the short-term ends and the uplink resource allocated by the base station.

In some embodiments, if the time difference 904 has a value close to 0, the channel blockage status may be determined dominantly for the channel state measured in the short-term. In another embodiment, if the time difference 904 has a value close to co, the channel blockage status may be determined dominantly for the channel state measured in the long-term.

FIG. 10A illustrates an example for measuring a channel blockage status in a short-term in a wireless communication system according to various embodiments of the disclosure.

Referring to FIG. 10A, a terminal may measure a channel blockage status in a short-term by using a channel blockage status measurement window 1001 configured by a base station. For example, the terminal may measure a ratio of slots occupied by an interference source and all slots included in the channel blockage status measurement window 1001. In this case, the measured ratio may be defined as a channel blockage status P2 measured in the short-term. Specifically, the channel blockage status measurement window 1001 may have a size TW2 1002 of a measurement window for measuring a channel blockage status during the short-term in a time domain, and the size TW2 1002 of the measurement window may be determined based on a time interval TCCA 1004 between slots included in the channel blockage status measurement window 1001 and the number N2 of the slots. For example, the size TW2 1002 of the measurement window may be defined as Equation 1 below.

$$T_{W2} = T_{CCA} \cdot N_2 \qquad (1)$$

In Equation 1, $T_{W2}$ denotes a size of a window for measuring a channel blockage status during a short-term, $T_{CCA}$ denotes a time interval between slots included in the channel blockage status measurement window, and $N_2$ denotes the total number of slots included in the channel blockage status measurement window. In some embodiments, the channel blockage status P2 measured in the short-term may be defined as Equation 2 below.

$$P_2(n) = \frac{1}{N_2} \sum_{m=0}^{N_2-1} \alpha_n(m) \qquad (2)$$

In Equation 2, P2(n) denotes a channel blockage status of a short-term, measured in an nth channel blockage status measurement window, N2 denotes the number of slots included in the channel blockage status measurement window, and $\alpha_n$ (m) denotes a channel occupancy state of an mth slot included in the nth channel blockage status measurement window. For example, if a channel is busy, $\alpha_n$(m) may have a value of 1, and if the channel is idle, $\alpha_n$(m) may have a value of 0. In the disclosure, a method of measuring the channel blockage status P2 measured in the short-term is not limited to the aforementioned method, and another method having the same technical meaning may be used.

Figure 10B:
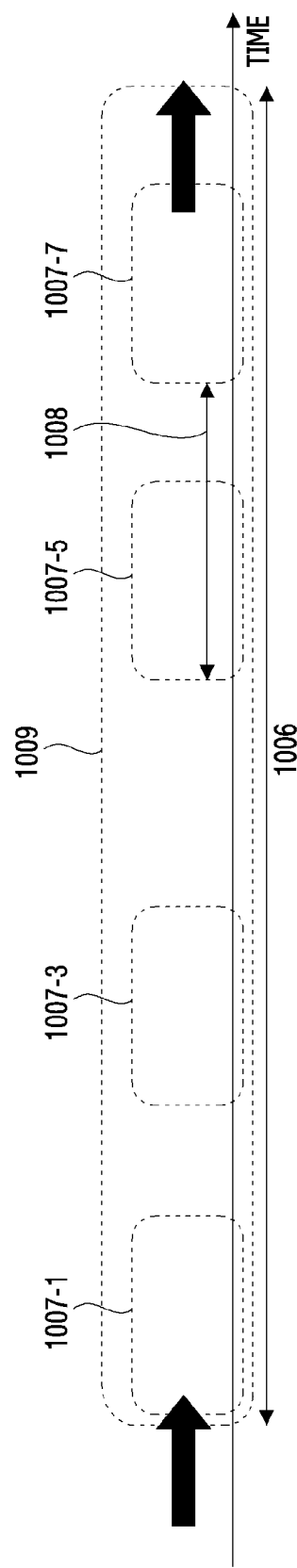
FIG. 10B illustrates an example for measuring a channel blockage status in a long-term in a wireless communication system according to various embodiments of the disclosure.

FIG. 10B illustrates an example for measuring a channel blockage status in a long-term in a wireless communication system according to various embodiments of the disclosure.

Referring to FIG. 10B, a terminal may measure a channel blockage status in a long-term based on a channel blockage status P2 measured in a short-term. In this case, the measured channel blockage status may be defined as a channel blockage status P1 measured in the long-term. Specifically, the terminal may measure the channel blockage status in the long-term by using a channel blockage status measurement window 1009. The channel blockage status measurement window 1009 has a size TW1 1006 of a measurement window for measuring a channel blockage status during the long-term in a time domain. The terminal may measure a channel blockage status P1 during the long-term by measuring a channel blockage status in a plurality of short-terms 1007-1 to 1007-7 included in the channel blockage status measurement window 1009. In this case, the long-term may be determined based on an interval TP2 1008 between start points of respective short-terms and the number N1 of a plurality of short-terms included in the measurement window 1009. In this case, TP2 may be defined as a measurement cycle of a short-term. For example, the size $T_{W1}$ 1006 of a measurement window for measuring the channel blockage status during the long-term may be defined as equation 3.

$$T_{W1} = T_{P2} \cdot N_1 \qquad (3)$$

In Equation 3, TW1 denotes a size of a measurement window for measuring the channel blockage status during the long-term, TP2 denotes an interval between start points of a short-term included in a measurement window, and N1 denotes the number of a plurality of short-terms included in the measurement window. In some embodiments, the channel blockage status P1 measured in the long-term may be defined as Equation 4 below.

$$P_1(n) = \frac{1}{N_1} \sum_{k=0}^{N_1-1} P_2(n-k) \qquad (4)$$

In Equation 4, P1(n) denotes a channel blockage status of a long-term, measured until an nth short-term, N1 denotes the number of a plurality of short-terms included in a measurement window, and P2(n–k) denotes a channel blockage status measured in an (n–k)th short-term. In some embodiments, measurement of the channel blockage status P1 measured in the long-term may be optional. Since a measurement method is not limited to the aforementioned method, another method having the same technical meaning may be used.

In some embodiments, a representative value P of the channel blockage status may be determined based on the channel blockage status P2 measured in the short-term and the channel blockage status P1 measured in the long-term. For example, the representative value P may be defined by Equation 5 below.

$$P(n) = (1-\alpha(T)) \cdot P_1(n) + \alpha(T) \cdot P_2(n) \qquad (5)$$

In Equation 5, P(n) denotes a representative value of a channel blockage status at an nth index, P1(n) denotes a channel blockage status measured in a long-term at the nth index, and P2(n) denotes a channel blockage status measured in a short-term at the nth index. α(T) denotes a correlation factor, and is expressed by a function of a time difference T between a measurement time point of a short-term and an actual measurement time point of uplink scheduling. In some embodiments, P(n) may be determined dominantly for P1(n) or P2(n) according to α(T). For example, α(T) may be converged to 1 as T becomes closer to 0. In this case, P(n) may be determined dominantly for P2(n). In addition, α(T) may be converged to 0 as T becomes closer to ∞. In this case, P(n) may be determined dominantly for P1(n). In some embodiments, α(T) may be a value obtained statistically. For example, α(T) may be determined by statistically averaging information regarding a mismatch between P2(t) measured for each of a plurality of short-terms and P2(t+T) measured at an actual scheduling time point. In some embodiments, α(T) may be predetermined and stored in the storage unit 230 of the base station 110 in a form of table. That is, the representative value P of the channel blockage status may be determined based on the channel blockage status value P2 measured by the terminal in the short-term and the channel blockage status value P1 measured in the long-term.

Figure 11:
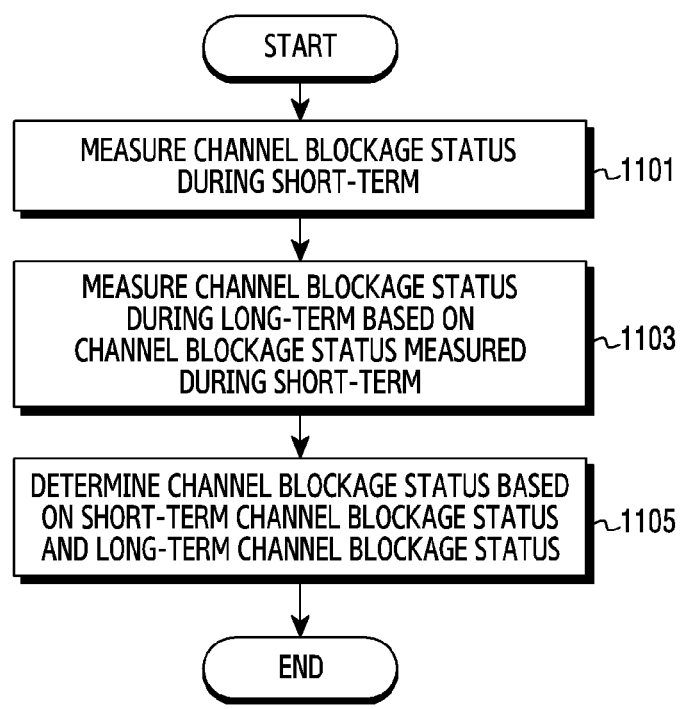
FIG. 11 is an exemplary flowchart of a terminal for measuring a channel blockage status by using time duration information in a wireless communication system according to various embodiments of the disclosure.

FIG. 11 is an exemplary flowchart of a terminal for measuring a channel blockage status by using time duration information in a wireless communication system according to various embodiments of the disclosure. One method of operating the terminal 120 is exemplified in FIG. 11.

Referring to FIG. 11, in step 1101, the terminal measures a channel blockage status during a short-term. For example, the terminal may receive configuration information including information on a measurement duration and measurement window configured by a base station. In addition, the terminal may measure a channel blockage status P2 of a short-term based on the configuration information. In some embodiments, the channel blockage status P2 in the short-term may be a value indicating whether an interference source is currently in an active state, that is, whether traffic exists in a buffer due to the interference source.

In step 1103, the terminal measures the channel blockage status during the long-term based on the channel blockage status measured during the short-term. For example, the terminal may measure the channel blockage status P2 for a plurality of short-terms included in the long-term configured by the base station. The terminal may measure the channel blockage status P1 during the long-term by using the channel blockage status P2 measured for the short-terms. In some embodiments, the channel blockage status P1 measured during the long-term may be a value indicating how frequently a channel is occupied during a long-term by density or traffic patterns or the like of an interference source.

In step 1105, the terminal determines a channel blockage status based on the channel blockage status measured during the short-term and the channel blockage status measured during the long-term. That is, the terminal may determine a representative value P of the channel blockage status based on the channel blockage status P2 measured during the short-term and the channel blockage status P1 measured during the long-term.

In some embodiments, the channel blockage status measured by using the time duration information may be reported differently to the base station as described below. For example, the representative value P of the channel blockage status and the channel blockage status P2 measured in the short-term may be reported to the base station through a control signal of a physical layer, i.e., a Layer 1 (L1). For example, the control signal of L1 may include uplink control information (UCI) and a physical uplink control channel (PUCCH). In addition, the representative value P of the channel blockage status and the channel blockage status P1 measured in the long-term may be transmitted to the base station according to a change in a surrounding environment of the terminal (e.g., a location of the terminal). For example, if P1 has a value less than or equal to a threshold, P and P1 may be reported to the base station through a Layer 3 (L3) message (e.g., an RRC message). That is, P1 and P2 may be distinguished from each other through a scheme of reporting from the terminal to the base station. However, the reporting scheme is not limited to the aforementioned scheme, and the measured channel blockage status may be reported through another scheme having the same technical meaning. The channel blockage status may be measured based on a specific time duration as described above, and the channel blockage status may be measured for a specific type of resource as described below.

In the disclosure, the base station may configure a punctured resource and an unpunctured resource so that the channel blockage status is measured by the terminal. In this case, the punctured resource may imply a blank resource. For example, the blank resource may imply a resource on which transmission power is not carrier or a resource to which a signal is not mapped. In some embodiments, the punctured resource may be configured in a resource area other than a resource area allocated to transmit essential control signals for terminals in a cell. For example, the essential control signals for the terminals in the cell may include a reference signal such as a cell-specific reference signal (CRS), a demodulation reference signal (DM-RS), a channel state information reference signal (CSI-RS), or the like, and a system information block (SIB). On the other hand, the unpunctured resource may imply a resource which is not blanked by the base station. That is, the unpunctured resource may imply a resource corresponding to certain downlink and uplink resources in a cell other than the punctured resource. In some embodiments, the unpunctured resource may include an overbooked uplink resource. The overbooked uplink resource may include an uplink resource allocated in an overlapping manner to a plurality of terminals. In other words, the overbooked uplink resource may imply a contention-based resource used by one terminal among the plurality of terminals. In some embodiments, the punctured resource and the unpunctured resource may be designated by the base station to measure the channel blockage status in each specific situation.

In some embodiments, the terminal may measure the channel blockage status in the punctured resource, and thus may measure a signal outside a cell as interference instead of measuring a signal inside the cell as interference. In the other hand, the terminal may measure the channel blockage status in the overbooked resource among the unpunctured resources, and thus may measure not only the signal outside the cell but also the signal inside the cell as interference. In this case, the base station may configure a measurement window for measuring the channel blockage status in the unpunctured resource for a resource allocated for overbooked uplink transmission, and may transmit information on a corresponding measurement window to the terminal. Hereinafter, FIG. 12 illustrates an example of a punctured resource and unpunctured resource configured by the base station.

Figure 12:
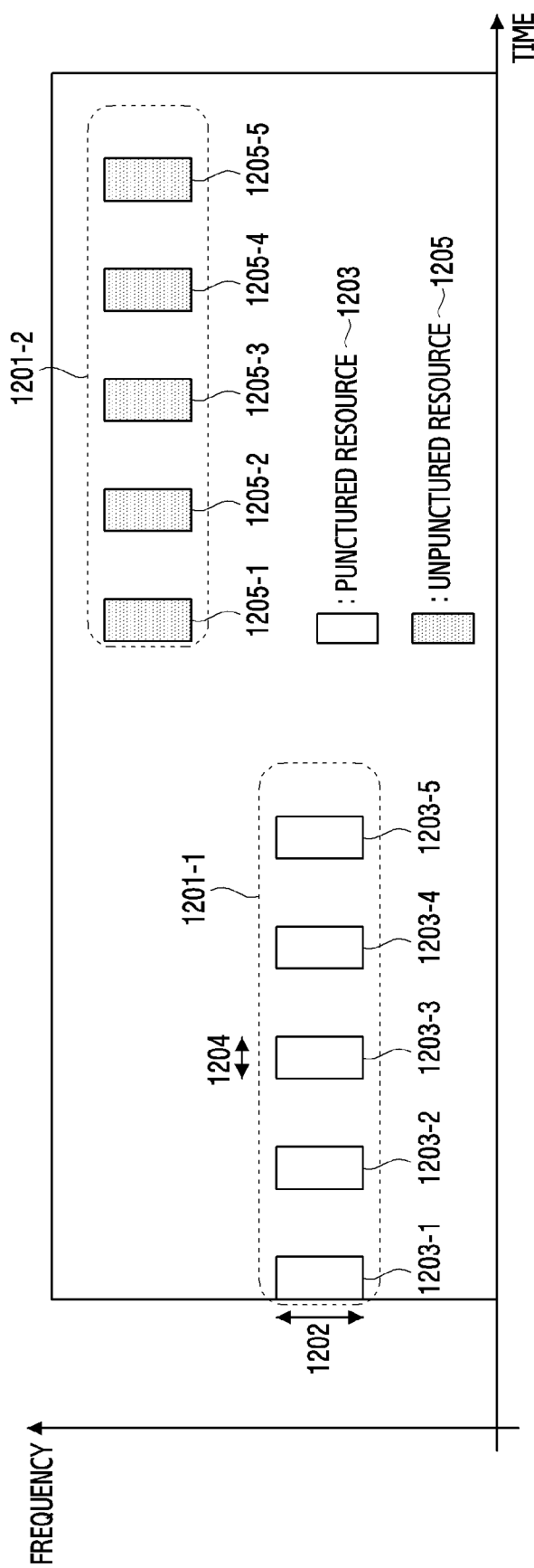
FIG. 12 illustrates an example of configuring uplink resources to measure a channel blockage status in a wireless communication system according to various embodiments of the disclosure.

FIG. 12 illustrates an example of configuring an uplink resource to measure a channel blockage status in a wireless communication system according to various embodiments of the disclosure.

Referring to FIG. 12, punctured resources and unpunctured resources may be respectively allocated to slots in unit of one resource block (RB) 1202 in a frequency axis and in unit of one OFDM symbol 1204 in a time axis. A base station may configure a channel blockage status measurement window 1201-1 including slots 1203-1 to 1203-5 to which the punctured resources are allocated and a channel blockage status measurement window 1201-2 including slots 1205-1 to 1205-5 to which the unpunctured resources are allocated. In some embodiments, the channel blockage status measurement windows 1201-1 to 1201-2 may include at least one of the punctured resource slot and the unpunctured resource slot. As described above, the base station may transmit configuration information including the punctured resources or unpunctured resources and information on a channel blockage status measurement window to the terminal. For example, the base station may transmit configuration information indicating whether measurement in the channel blockage status measurement window is measurement for the punctured resources or for the unpunctured resources, through UE-specific DCI. The terminal which has received the configuration information may identify whether a measured channel blockage status P is a channel blockage status Ppunc for the punctured resources or a channel blockage status Punpunc for the unpunctured resources, and may report the result to the base station. In other embodiments, if the terminal fails to receive the configuration information indicating whether the measurement is the measurement for the punctured resources or the measurement for the unpunctured resources from the base station, the terminal may report information on the measured channel blockage status P and a time point (e.g., a slot number, a frame number) at which the channel blockage status is measured, to the base station. The base station may identify the channel blockage status P measured from the terminal as Ppunc or Punpunc. In some embodiments, Ppuncd and Punpunc may be a channel blockage status P1 measured in a long-term or a channel blockage status P2 measured in a short-term or a representative value P of a channel blockage status determined based on P1 and P2, respectively described in FIG. 10A and FIG. 10B. An uplink resource configuration may include punctured resources or unpunctured resources as described above. In this case, the punctured resources may be classified on a cell basis or a cell group basis as described below.

In the disclosure, the base station may configure resources punctured on a per-cell basis and resources punctured on a per-cell group basis, in order for the terminal to measure the channel blockage status. For example, the resources punctured on a per-cell basis implies punctured resources on time and frequency axes predetermined between the base station and terminal in the same cell. The base station may configure the resources punctured on a per-cell basis, and may notify this to the terminals in the same cell. The terminal which has received configuration information on resources may measure a received signal strength indicator (RSSI) only in the resources punctured on a per-cell basis, and thus may measure a channel blockage status for the remaining signals (e.g., a signal of NR-unlicensed (U) cells outside the cell, a signal of Wi-Fi nodes) except for a downlink signal of the base station in the cell and an uplink signal of the terminal. Accordingly, the terminal may identify a signal of the base station and terminal included in the cell and signal strength of an interference source, and thus may efficiently measure the channel blockage status.

In addition, the resources punctured on the per-cell group basis implies punctured resources on time and frequency axes predetermined between all base stations and terminals included in a plurality of NR-U cells. The base station may configure the resources punctured on the per-cell group basis, and may share this through communication with base stations in each cell group. Each of the base stations included in the cell group may notify shared information to terminals in the cell group. For example, each of the base stations may notify information on the resources punctured on the per-cell group basis to the terminals through UE-specific RRC signaling. The terminal which has received configuration information for resources may measure a RSSI only in the resources punctured on a per-cell group basis, and thus may measure a channel blockage status for the remaining signals (e.g., a signal of NR-U cells outside the cell group, a signal of Wi-Fi nodes) except for a downlink signal of the base station in the cell group and an uplink signal of the terminal. Accordingly, the terminal may identify a signal of the base station and terminal included in the cell group and signal strength of an interference source, and thus may efficiently measure the channel blockage status. In some embodiments, if a channel blockage status measurement window used by the terminal to measure the channel blockage status includes the resources punctured on the per-cell basis, the base station may determine a channel blockage status P reported by the terminal as a channel blockage status Pcell in unit of a cell in other embodiments, if the channel blockage status measurement window includes the resources punctured on the per-cell group basis, the base station may determine the channel blockage status P reported by the terminal as a channel blockage status Pcellgroup in unit of a cell group. Hereinafter, FIG. 13 and FIG. 14 illustrate an example of a method of operating a terminal which measures a channel blockage status based on information on a resource configuration configured by a base station, that is, a punctured resource, an unpunctured resource, a resource punctured on a per-cell basis, or a resource punctured on a per-cell group basis.

Figure 13:
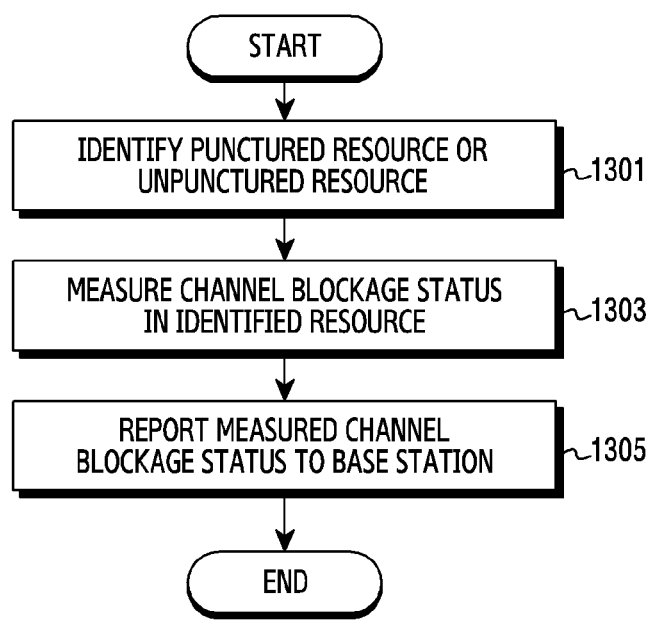
FIG. 13 is an exemplary flowchart of a terminal which measures a channel blockage status based on punctured resources or unpunctured resources in a wireless communication system according to various embodiments of the disclosure.
Figure 14:
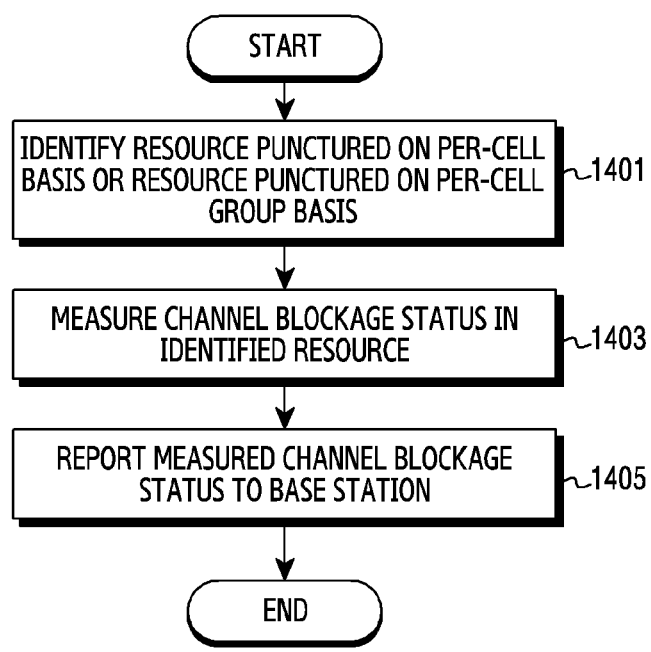
FIG. 14 is an exemplary flowchart of a terminal which measures a channel blockage status based on resources punctured on a per-cell basis or resources punctured on a per-cell group basis in a wireless communication system according to various embodiments of the disclosure.

FIG. 13 is an exemplary flowchart of a terminal which measures a channel blockage status based on punctured resources or unpunctured resources in a wireless communication system according to various embodiments of the disclosure. A method of operating the terminal 120 is exemplified in FIG. 13.

Referring to FIG. 13, in step 1301, a terminal identifies punctured resources or unpunctured resources. The punctured resources or the unpunctured resources may be configured by a base station. In some embodiments, the base station may transmit information on a resource configuration to the terminal through UE-specific DCI. However, in other embodiments, the information on the resource configuration may not be transmitted in advance to the terminal.

In step 1303, the terminal measures a channel blockage status in an identified uplink resource. For example, the terminal may measure the channel blockage status in a punctured resource or unpunctured resource area. If the terminal measures the channel blockage status in the punctured resources, a signal inside a corresponding cell is not measured as interference. Otherwise, if the terminal measures the channel blockage status in the unpunctured resources, not only a signal outside the cell but also the signal inside the cell may be measured as interference.

In step 1305, the terminal reports the measured channel blockage status to the base station. In some embodiments, if the information on the resource configuration is received in advance from the base station, the terminal may identify and report the channel blockage status on the resource configuration to the base station. For example, the terminal may report the channel blockage status to the base station by identifying a channel blockage status P1 measured in the punctured resources or a channel blockage status P2 measured in the unpunctured resources. In other embodiments, if the information on the resource configuration is not received in advance from the base station, the terminal may measure the channel blockage status and may report it to the base station together with measurement timing. The base station may identify the channel blockage status for the resource configuration based on the measurement timing. According to the aforementioned procedure, the terminal may measure the channel blockage status based on the configuration of the punctured resources or unpunctured resources, and the base station may identify and manage the channel blockage status based on the resource configuration.

FIG. 14 is an exemplary flowchart of a terminal which measures a channel blockage status based on resources punctured on a per-cell basis or resources punctured on a per-cell group basis in a wireless communication system according to various embodiments of the disclosure. A method of operating the terminal 120 is exemplified in FIG. 14.

Referring to FIG. 14, in step 1401, a terminal identifies resources punctured on a per-cell basis or resources punctured on a per-cell group basis. The resources punctured on the per-cell basis or the resources punctured on the per-cell group basis may be configured by a base station. In some embodiments, the base station may transmit information on a resource configuration to the terminal through UE-specific DCI. However, in other embodiments, the information on the resource configuration may not be transmitted in advance to the terminal.

In step 1403, the terminal measures a channel blockage status in identified resources. For example, the terminal may measure the channel blockage status in the resources punctured on the per-cell basis or the resources punctured on the per-cell group basis. Accordingly, the terminal may measure the channel blockage status occupied by the interference source included in an outside of a cell or cell group.

In step 1405, the terminal reports the measured channel blockage status to the base station. In some embodiments, if the information on the resource configuration is received from the base station, the terminal may identify and report the channel blockage status on the resource configuration to the base station. For example, the terminal may provide a report to the base station by identifying resources Pcell punctured on a per-cell basis and resources Pcellgroup punctured on a per-cell group basis. In other embodiments, if the information on the resource configuration is not received in advance from the base station, the terminal may first measure the channel blockage status and may report it to the base station. In this case, if a measurement window used by the terminal to measure the channel blockage status includes the resources punctured on the per-cell basis, the base station may define a corresponding channel blockage status as resources Pcell punctured on a cell basis. In addition, if the measurement window used by the terminal to measure the channel blockage status includes the resources punctured on the per-cell group basis, the base station may define a corresponding channel blockage status as resources Pcellgroup punctured on a cell group basis.

In addition to the aforementioned punctured resource, unpunctured resource, resource punctured on the per-cell basis, and resource punctured on the per-cell group basis, the terminal may measure the channel blockage status based on a channel occupancy time of the base station.

In some embodiments, the base station may determine a maximum COT to occupy an unlicensed band. Herein, the maximum COT implies a maximum value of time allocated to perform uplink data transmission and downlink data transmission by the base station and the terminal through the unlicensed band. The base station may perform channel detection according to downlink LBT (e.g., category-4 LBT) to occupy the COT. In this case, an area in which the base station performs channel detection during a time duration allocated for a downlink LBT operation may be defined as a detection area. That is, the base station may detect whether an interference node exists in the detection area of the base station during a time duration allocated for the downlink category-4 LBT operation. Herein, when it is said that the base station occupies the COT according to the downlink category-4 LBT, this implies there is no interference node which currently occupies a channel in the detection area of the base station. Therefore, when it is said that the channel blockage status is measured during the COT duration, this may imply that the channel blockage status is measured for an interference node not belonging to the detection area of the base station. On the other hand, when the channel blockage status is measured during a time duration not corresponding to the COT, since the channel is not occupied by the base station, the terminal may measure the channel blockage status for interference nodes around the terminal irrespective of a channel occupied by the base station. Accordingly, there is a need to measure the channel blockage status based on the COT in order to effectively measure the channel blockage status. Hereinafter, FIG. 15A and FIG. 15B illustrate a specific example of measuring a channel blockage status based on the COT of the base station.

Figure 15A:
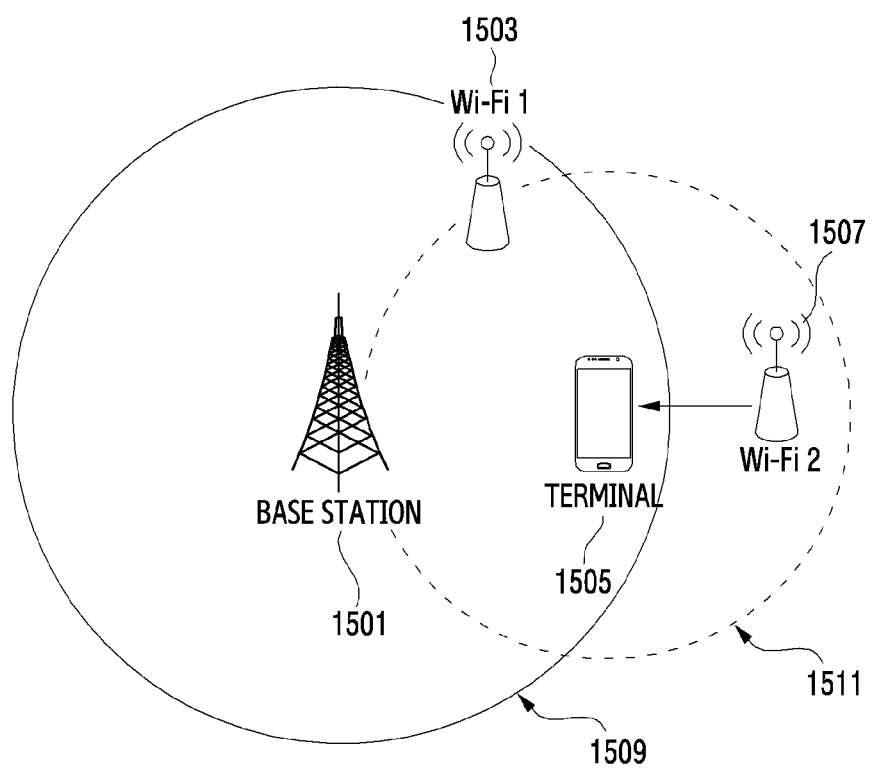
FIG. 15A illustrates an example of measuring a channel blockage status during a channel occupancy time (COT) of a base station in a wireless communication system according to various embodiments of the disclosure.

FIG. 15A illustrates an example of measuring a channel blockage status during a COT of a base station in a wireless communication system according to various embodiments of the disclosure.

Referring to FIG. 15A, a base station 1501 may determine whether a channel is occupied by a terminal 1505 and a Wi-Fi 1 1503, which are included in a detection area 1509 of the base station, during a time duration allocated for downlink category-4 LBT to occupy a COT. If the base station 1501 occupies the COT, the base station 1501 may transmit information on start and end timings of the COT to the terminal 1505. In some embodiments, the information on the start and end timings of the COT may be transmitted to the terminal through common-DCI. The terminal 1505 may know that any slot allocated in a window for measuring a channel blockage status is included in the COT of the base station by using received timing related information. Therefore, the terminal 1505 may measure a channel blockage status based on a Wi-Fi 2 1507 included in a detection area 1511 in which the terminal performs channel detection during a time duration allocated for uplink LBT (e.g., category-2 LBT) of the terminal 1505, except for the Wi-Fi 1 1503 detected by the base station 1501. In this case, the measured channel blockage status may be defined as a channel blockage status PCOTin measured in a duration included in the COT.

Figure 15B:
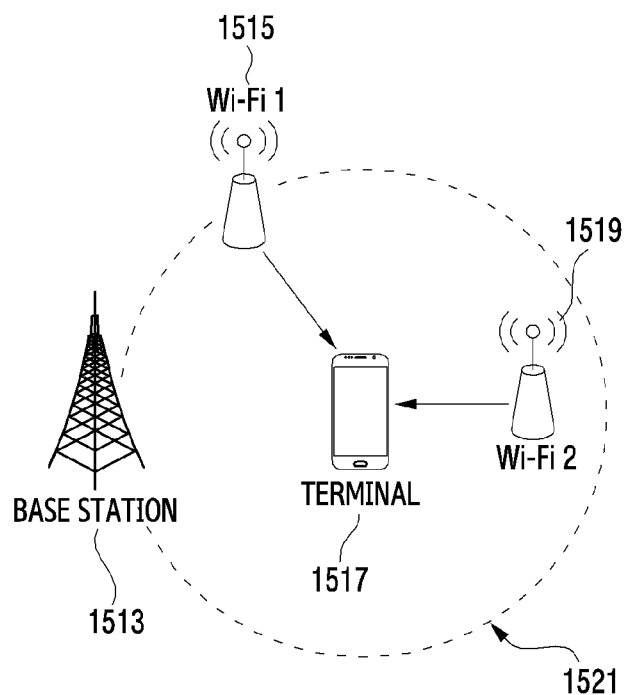
FIG. 15B illustrates an example of measuring a channel blockage status not included in a COT of a base station in a wireless communication system according to various embodiments of the disclosure.

FIG. 15B illustrates an example of measuring a channel blockage status not included in a COT of a base station in a wireless communication system according to various embodiments of the disclosure.

Referring to FIG. 15B, if a channel blockage status measurement time point of a terminal 1517 is not included in a COT of a base station 1513, it may be regarded that a channel is not occupied according to downlink LBT of the base station 1513. Therefore, the terminal 1517 may measure a channel blockage status for interference nodes around the terminal 1517 irrespective of a channel occupied by the base station 1513. Specifically, the base station 1513 may transmit information on start and end timings of the COT to the terminal 1517. In some embodiments, the information on the start and end timings of the COT may be transmitted to the terminal through common-DCI. The terminal 1517 may know that any slot allocated in a window for measuring a channel blockage status is not included in the COT of the base station 1513 by using received timing related information. Therefore, the terminal 1517 may measure a channel blockage status for a Wi-Fi 1 1515 and Wi-Fi 2 1519 included in a detection area 1521 in which the terminal performs channel detection during a time duration allocated for an uplink LBT operation of the terminal 1517, irrespective of channel detection based on downlink LBT of the base station. In this case, the measured channel blockage status may be defined as a channel blockage status PCOTout measured in a duration not included in the COT.

In some embodiments, the base station may determine a transmission scheme of the terminal based on a channel blockage status PCOTin measured in a duration included in the COT or a channel blockage status PCOTout measured in a duration not included in the COT.

For example, since a scheduled uplink (SUL) transmission scheme is accompanied by a downlink LBT procedure of a base station, channel detection based on the base station may be performed. Therefore, the base station may schedule the SUL transmission scheme based on PCOTin. For example, irrespective of whether PCOTout is high or low, if PCOTin is lower than a specific threshold, the SUL transmission scheme may be scheduled. On the other hand, an autonomous uplink (AUL) transmission scheme is not always accompanied by a downlink LBT procedure of the base station. Therefore, in this case, the base station may schedule the AUL transmission scheme based on PCOTout irrelevant to channel detection based on the base station. For example, if PCOTout is lower than a threshold, the AUL transmission scheme may be scheduled.

In addition, if part of a measurement window for measuring a channel blockage status is included in the COT, the terminal may measure the channel blockage status during a long-term, and may determine this as the channel blockage status.

Figure 16:
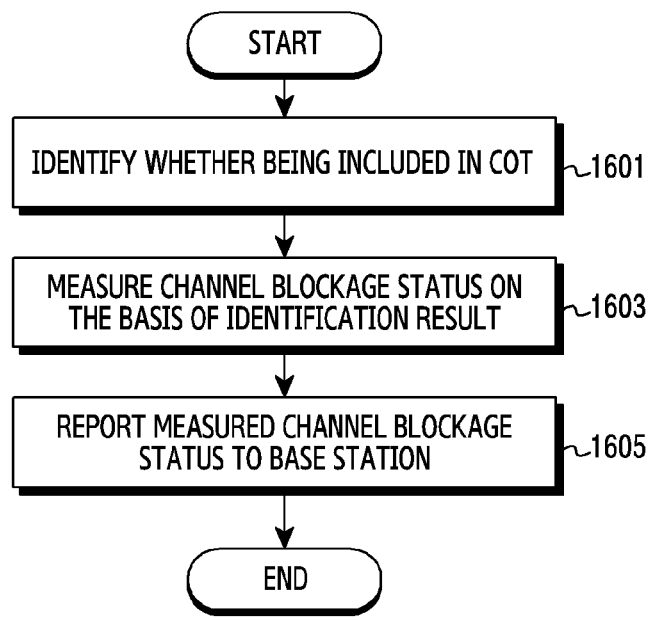
FIG. 16 is an exemplary flowchart of a terminal which measures a channel blockage status based on a COT of a base station in a wireless communication system according to various embodiments of the disclosure.

FIG. 16 is a flowchart of a terminal which measures a channel blockage status based on a COT of a base station in a wireless communication system according to various embodiments of the disclosure. A method of operating the terminal 120 is exemplified in FIG. 16.

Referring to FIG. 16, in step 1601, a terminal identifies whether being included in a COT. For example, the terminal may identify whether a slot in a measurement window used to measure a channel blockage status is included or not included in the COT of the base station. That is, the terminal may identify whether a channel blockage status measurement time point is included in the COT based on information on start and end timings of the COT transmitted by the base station. In some embodiments, information on the start and end timings of the COT may be transmitted from the base station to the terminal through common-DCI. In other embodiments, the information on start and end timings of the COT may not be transmitted to the terminal.

In step 1603, the terminal measures the channel blockage status based on the identification result. For example, if a channel blockage status measurement time point is included in a COT, the terminal may measure the channel blockage status except for an interference source detected by the base station. If the channel blockage status measurement time point is not included in the COT, the terminal may measure the channel blockage status irrespective of a detection result based on the base station. In some embodiments, if information on the start and end timings of the COT is not transmitted to the base station and thus the terminal is not capable of identifying whether the channel blockage status measurement time point is included in the COT, the terminal may measure the channel blockage status irrespective thereof.

In step 1605, the terminal reports the measured channel blockage status to the base station. For example, the terminal may report to the base station a channel blockage status PCOTin measured in a duration included in the COT or a channel blockage status PCOTout measured in a duration not included in the COT. However, if the terminal fails to receive information on the start and end timings of the COT from the base station, the terminal may report all of the measured channel blockage status and information on a time point (e.g., a slot number, a frame number) at which the state is measured, to the base station. The base station may identify the channel blockage status measured by the terminal as PCOTin or PCOTout based on the received measurement timing. According to the aforementioned procedure, the terminal may measure the channel blockage status based on whether the channel blockage status measurement time point is included in the COT, and the base station may identify and manage this.

In the disclosure, the terminal may measure various channel blockage status by using the channel blockage status measurement method described in FIG. 9 to FIG. 16. Hereinafter, FIG. 17 to FIG. 22 describe examples of uplink resource scheduling of a base station, performed based on the measured channel blockage status.

Figure 17:
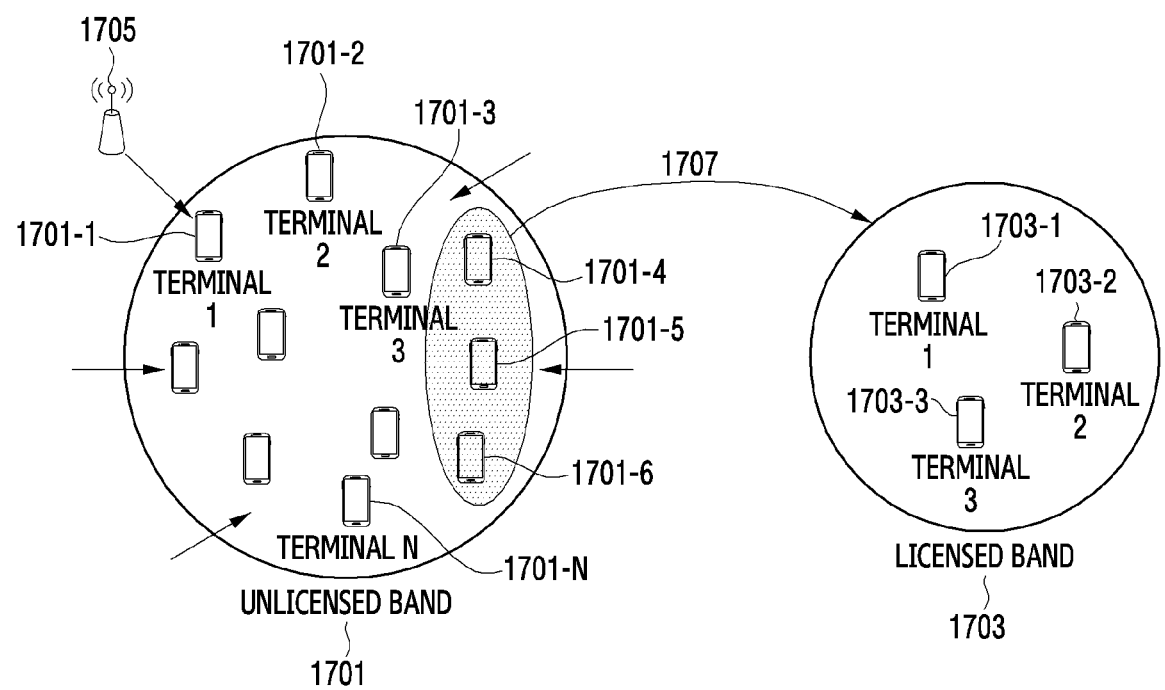
FIG. 17 illustrates an example of resource allocation based on a licensed or unlicensed band in a wireless communication system according to various embodiments of the disclosure.

FIG. 17 illustrates an example of resource allocation based on a licensed or unlicensed band in a wireless communication system according to various embodiments of the disclosure.

Referring to FIG. 17, if there are N terminals 1701-1 to 1701-N to which resources are allocated in an unlicensed band by a base station, among them, a terminal having a relatively high channel blockage status may have a disadvantage in that resources are allocated in an unlicensed band in terms of overall network efficiency. Therefore, the base station allows some terminals to be served in the licensed band in a group to which resources are allocated in the unlicensed band, thereby improving overall network efficiency in terms of load balancing. In this case, the channel blockage status may be a channel blockage status P1 measured in a long-term. For example, if the N terminals 1701-1 to 1701-N scheduled for resource allocation in the unlicensed band are included in a group 1701 and three terminals 1703-1 to 1703-3 scheduled for resource allocation in the licensed band are included in a group 1703, the base station may allocate terminals 1701-4 to 1701-6 having a high P1 among the N terminals 1701-1 to 1701-N from the group 1701 to the group 1703 (see 1707). That is, the base station may allow the terminals 1701-4 to 1701-6 to be served in the licensed band. In some embodiments, when some of the terminals served in the unlicensed band are allocated to the licensed band, this may be defined as unlicensed band de-attaching. In addition, when some of the terminals served in the licensed band are allocated to the unlicensed band, this may be defined as unlicensed band attach. In this case, quality of service (QoS) of the terminals 1703-1 to 1703-3 served in the licensed band may be guaranteed. In some embodiments, a situation may be assumed in which overall network utility is calculated according to P1 of each terminal and from which band the terminal is served. In this situation, the base station may sort P1 of the N terminals served in the licensed band in a descending order, and unlicensed band de-attaching may be performed one by one from a terminal having a highest P1, thereby detecting a distribution state of terminals in each band which maximizes the overall network utility.

Figure 18:
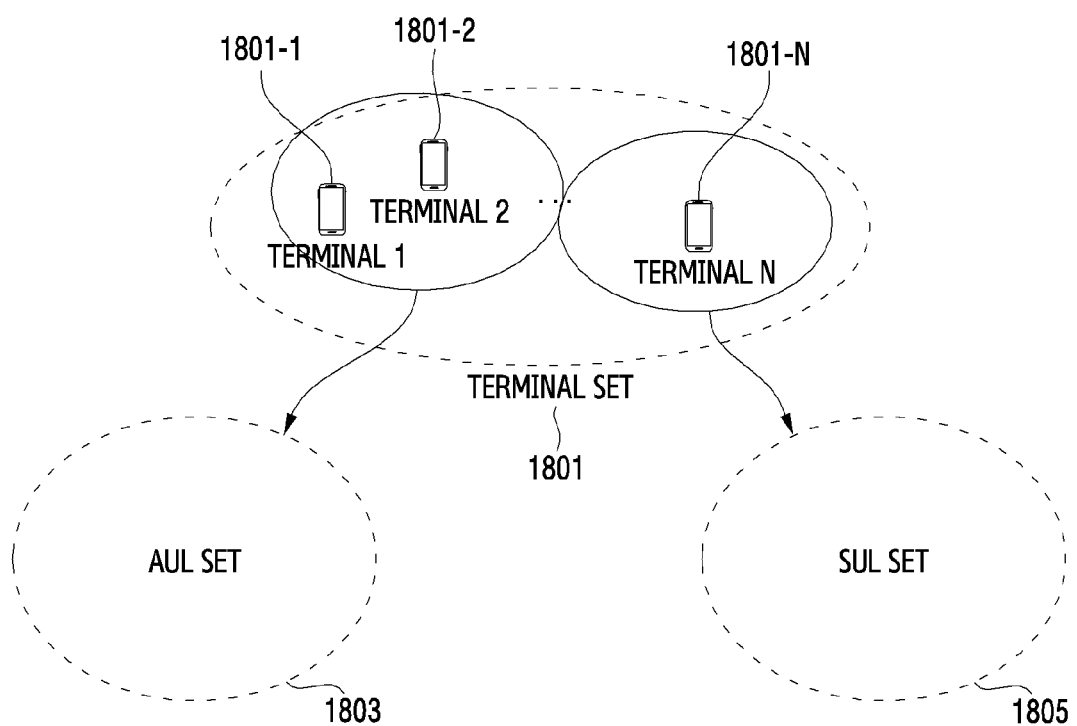
FIG. 18 illustrates an example of determining a transmission mode of a terminal in a wireless communication system according to various embodiments of the disclosure.

FIG. 18 illustrates an example of determining a transmission mode of a terminal in a wireless communication system according to various embodiments of the disclosure.

Referring to FIG. 18, a base station may determine a transmission mode of each terminal to maximize resource utility efficiency of all terminals. For example, the transmission mode may imply a SUL or AUL transmission scheme. The base station may determine the transmission mode of each terminal based on a channel blockage status P1 of a long-term, measured by the terminal, a channel blockage status PCOTin measured in a duration included in a COT, and a channel blockage status PCOTout measured in a duration not included in the COT. Specifically, the base station may allocate terminals 1801-1 and 1801-2 of which PCOTout and P1 are lower than a specific threshold among a terminal set 1801 including a plurality of terminals 1801-1 to 1801-N to an AUL set 1803 which uses an AUL transmission mode. The base station may allocate the terminal 1801-N of which PCOTin is lower than a specific threshold to an SUL set 1805 which uses an SUL transmission mode irrespective of whether P1 is higher than the specific threshold. Terminals allocated to each set may perform uplink transmission by using a corresponding transmission scheme. In some embodiments, the base station may also determine the transmission mode of the terminals through a scheme described below. First, a situation may be assumed in which a downlink channel blockage status of the base station is measured by the terminal and reported to the base station. In this case, the downlink channel blockage status may be referred to as a 'downlink clear channel assessment blockage status (DCBS)'. In case of the AUL, since the terminal may occupy a channel through CCA performed one time, whether a DCBS of the base station is high or low does not have effect on determining of a transmission mode of the terminal. However, since AUL resources may exist irrespective of whether a channel blockage status measurement time is included in the COT of the base station, it is not appropriate to allocate the AUL resources to a terminal of which P1 is higher than a threshold. On the other hand, in case of the SUL, since SUL resources are allocated to an area included in the COT of the base station, even if P1 is higher than the threshold, the SUL resources may be allocated to a terminal of which PCOTin is measured to be high and PCOTout is measured to be low. The base station may determine the transmission mode of the terminal with reference to a feature of the terminal in the aforementioned AUL resources and SUL resources. For example, if the DCBS is high, the base station may allocate the AUL transmission mode to terminals of which P1 is lower than a threshold, and may allocate the SUL transmission mode through not an unlicensed band but a licensed band. In addition, if the DCBS is low, the base station may allocate the SUL transmission mode sequentially to terminals of which PCOTout is low among the terminals of which P1 is higher than the threshold, and may allocate the AUL transmission mode to a terminal of which P1 is lower than the threshold among the remaining terminals. According to the aforementioned procedure, if the transmission mode of the terminal is determined as the AUL mode, the AUL resources may be allocated as described below.

Figure 19:
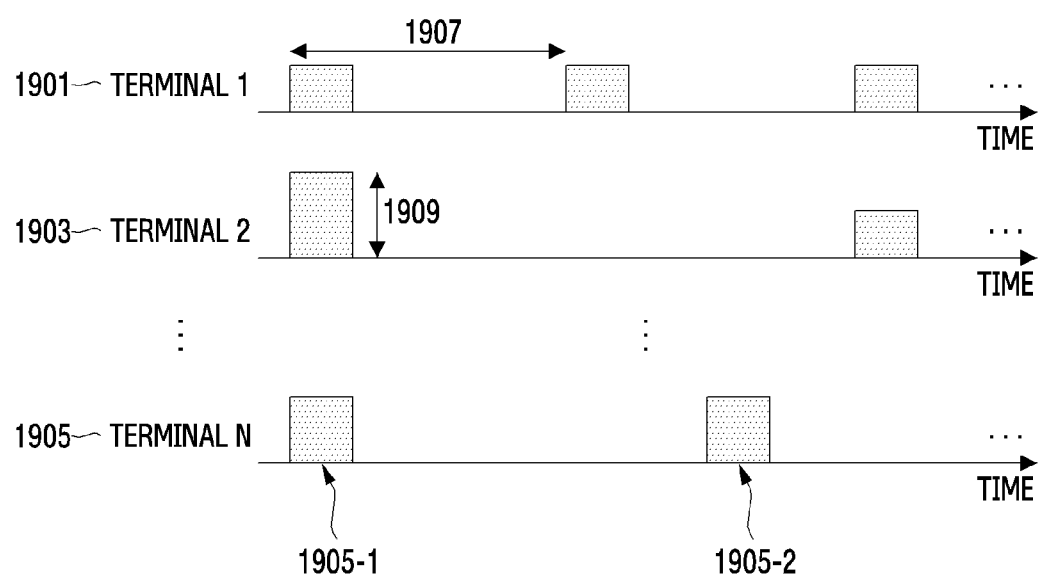
FIG. 19 illustrates an example of AUL resource allocation of a base station in a wireless communication system according to various embodiments of the disclosure.

FIG. 19 illustrates an example of AUL resource allocation of a base station in a wireless communication system according to various embodiments of the disclosure.

Referring to FIG. 19, a base station may allocate semi-persistent time and frequency resources to maximize resource utility efficiency of each terminal. For example, the base station may cyclically allocate resources with an interval of an AUL cycle 1907 with respect to a terminal 1 1901. In addition, the base station may allocate a frequency resources 1909 with respect to a terminal 2 1903. However, the AUL cycle 1907 and the frequency resources 1909 may be adjusted based on the channel blockage status measured in each terminal. Herein, the channel blockage status may imply a channel blockage status P1 measured in the long-term, a channel blockage status Ppunc measured in punctured resources, and a channel blockage status PCOTout measured in a duration not included in the COT. For example, if the channel blockage status of the terminal N 1905 is higher than the specific threshold, a relatively short AUL cycle and a small amount of frequency resources 1905-1 may be allocated to a terminal N 1905. In addition, if the channel blockage status of the terminal N 1905 is lower than the specific threshold, a relatively long AUL cycle and a great amount of frequency resources 1905-2 may be allocated to the terminal N 1905.

In general, if a set of terminals which require resource allocation is defined as S, in the existing proportional fairness (PF) algorithm, resource allocation for each terminal may be defined as Equation 6 below.

$$i^* = \operatorname*{argmax}_{i \in S} \frac{r_k^{(i)}[t]}{\overline{R}^{(i)}[t-1]}, \forall k \in \mathcal{K} \quad (6)$$

In Equation 6, i* denotes an index of a terminal selected by a scheduler, S denotes a set of terminals to which a resource is allocated, $\overline{R}^{(i)}[t-1]$ denotes an average throughput in a (t−1)th subframe of an ith terminal, $r_k^{(i)}[t]$ denotes an instantaneous rate (or spectral efficiency) for a tth subframe of a kth resource block, k denotes a resource block index, and $\mathcal{K}$ denotes a resource block set. $r_k^{(i)}[t]$ and $\overline{R}^{(i)}[t-1]$ of each terminal may be reported in advance to the base station or may be pre-determined. In some embodiments, $\overline{R}^{(i)}[t]$ may be defined as Equation 7 below.

$$\overline{R}^{(i)}[t] = \begin{cases} (1-\rho_\omega)\overline{R}^{(i)}[t-1] + \rho_\omega \sum_{k \in C_i} r_k^{(i)}[t] & (1) \\ (1-\rho_\omega)\overline{R}^{(i)}[t-1] & (2) \end{cases} \quad (7)$$

In Equation 7, $\overline{R}^{(i)}[t]$ denotes an average throughput in a tth subframe of an ith terminal, $\Sigma_{k \in C_i} r_k^{(i)}[t]$ denotes a value obtained by adding an instantaneous rate of all resource blocks allocated to the ith terminal in the tth subframe, $r_k^{(i)}[t]$ denotes an instantaneous rate for the t-th subframe of a kth resource block of the i-th terminal, Ci denotes a set of resource blocks allocated to the i-th terminal, and $\rho_\omega$ denotes a sort of coefficient for determining which value will be more considered between $\overline{R}^{(i)}[t-1]$ and $\Sigma_{k \in C_i} r_k^{(i)}[t]$ in a process of obtaining $\overline{R}^{(i)}[t]$. If a corresponding terminal is a terminal to which a resource is allocated, $\overline{R}^{(i)}[t]$ may be determined through formula (1) of Equation 7. In addition, if the corresponding terminal is a terminal to which a resource is not allocated, $\overline{R}^{(i)}[t]$ may be determined through formula (2) of Equation 7. In this case, $\rho_\omega$ may be defined as Equation 8 below.

$$\rho_\omega = \frac{T_s}{T_\omega} \quad (8)$$

In Equation 8, $T_S$ denotes a slot length, and Tω denotes a length of a measurement window. $T_S$ denotes a time unit for performing scheduling by the base station. For example, in case of an LTE system, $T_S$ is 1 ms. In addition, Tω is a configurable parameter. The smaller the value $\rho_\omega$, that is, the greater the value Tω, the more the value $\overline{R}^{(i)}[t]$ may be influenced by $\overline{R}^{(i)}[t-1]$. The greater the value $\rho_\omega$, that is, the smaller the value Tω, the more the $\overline{R}^{(i)}[t]$ may be influenced by $\Sigma_{k \in C_i} r_k^{(i)}[t]$.

However, in an unlicensed band, since uplink LBT of the terminal may fail due to an interference node which is not detected in downlink LBT of the base station, the existing PF algorithm may not operate properly. Therefore, improved PF scheduling considering the channel blockage status P may be performed. For example, the improved PF scheduling may be defined as Equation 9 below.

$$i^* = \operatorname*{argmax}_{i \in S}(1 - P^{(i)}[t]) \frac{r_k^{(i)}[t]}{\overline{R}^{\prime(i)}[t-1]}, \forall k \in \mathcal{K} \quad (9)$$

In Equation 9, i* denotes a resource allocated at an ith user index, S denotes a set of terminals to which a resource is allocated, $\overline{R}^{(i)}[t-1]$ denotes an average throughput in a (t−1)th subframe of an ith user, $r_k^{(i)}[t]$ denotes an instantaneous rate for a tth subframe of a kth resource block of the ith user, k denotes a resource block index, and $\mathcal{K}$ denotes a resource block set. $P^{(i)}[t]$ may denote a channel blockage status P2 of a short-term, measured in the tth subframe, or a channel blockage status Ppunc in a punctured resource and a channel blockage status PCOTin measured in a duration included in COT. In some embodiments, $\overline{R}^{\prime(i)}[t]$ may be defined as Equation 10 below.

$$\overline{R}'^{(i)}[t] = \begin{cases} (1-\rho_\omega)\overline{R}'^{(i)}[t-1] + \rho_\omega(1-P^{(i)}[t])\sum_{k \in C_i} r_k^{(i)}[t] & (3) \\ (1-\rho_\omega)\overline{R}'^{(i)}[t-1] & (4) \end{cases} \quad (10)$$

In Equation 10, $\overline{R}'^{(i)}[t]$ denotes an improved average throughput in a tth subframe of an ith terminal, $\Sigma_{k \in C_i} r_k^{(i)}[t]$ denotes a value obtained by adding an instantaneous rate of all resource blocks allocated to the ith terminal in the tth subframe, $r_k^{(i)}[t]$ denotes an instantaneous rate for the tth subframe of a kth resource block of the ith terminal, Ci denotes a set of a resource block allocated to the ith terminal, and $\rho_\omega$ denotes a sort of coefficient for determining which value will be more considered between $\overline{R}'^{(i)}[t-1]$ and $\Sigma_{k \in C_i} r_k^{(i)}[t]$ in a process of obtaining $\overline{R}'^{(i)}[t]$.

If a corresponding terminal is a terminal to which a resource is allocated, $\overline{R}'^{(i)}[t]$ may be determined through formula (3) of Equation 10. In addition, if the corresponding terminal is a terminal to which a resource is not allocated, $\overline{R}'^{(i)}[t]$ may be determined through formula (4) of Equation 10. That is, for improved uplink resource scheduling, the base station may schedule an uplink resource based on the channel blockage status. In addition, the base station may perform scheduling by dividing terminals into groups to perform improved uplink resource scheduling. Hereinafter, FIG. 19 illustrates an example of group-based scheduling.

Figure 20:
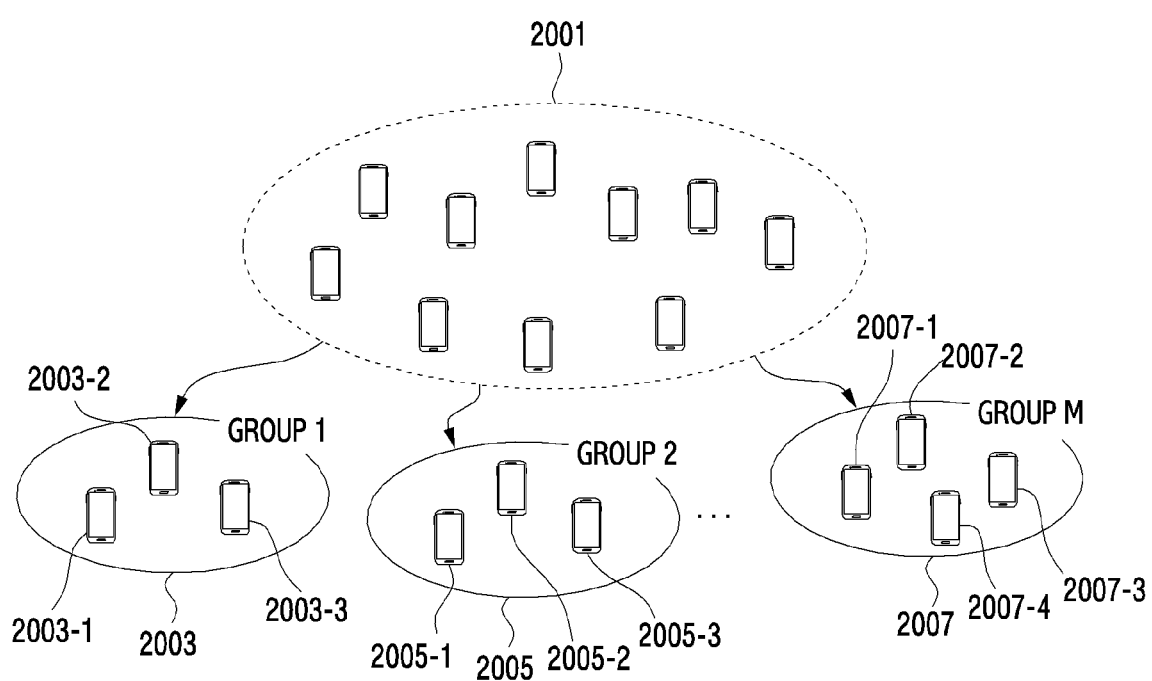
FIG. 20 illustrates an example of group-based scheduling of a base station in a wireless communication system according to various embodiments of the disclosure.

FIG. 20 illustrates an example of group-based scheduling of a base station in a wireless communication system according to various embodiments of the disclosure.

Referring to FIG. 20, the base station may determine a group of terminals based on a channel blockage status to maximize resource utility efficiency of the terminals. In this case, the channel blockage status may indicate a channel blockage status P1 in a long-term, a channel blockage status Ppunc in a punctured resource, and a channel blockage status PCOTout measured in a duration not included in COT. In some embodiments, the base station may determine N terminals 2001 as groups 2003 to 2007. In this case, it may be assumed that unlicensed band de-attaching may be performed in advance for terminals having a channel blockage status higher than a threshold Pthreshold 1. In some embodiments, when each of terminals 2003-1 to 2003-3 has a channel blockage status higher than a specific threshold Pthreshold 2, the base station may group the terminals 2003-1 to 2003-3 as the group 1 2003 and allocate the same resources. In this case, the channel blockage status measured for the group 1 2003 may be lower than the channel blockage status measured for each of the terminals 2003-1 to 2003-3. For example, a channel blockage status measured based on a group may be defined as Equation 11 below.

$$P^{(G_m)} = 1 - \Pi_{i \in G_m} P^{(i)} \leq P_{threshold\ 2} \quad (11)$$

In Equation 11, $P^{(G_m)}$ denotes a channel blockage status in an mth group, $P^{(i)}$ denotes a channel blockage status of an ith terminal, and $P_{threshold\ 2}$ denotes a predetermined threshold for grouping terminals as a group 1. In this case, if $P^{(i)}$ of a terminal is great, that is, is greater than $P_{threshold\ 2}$, a base station may allocate the terminal to a group m so that $P^{(G_m)}$ has a low value. For example, if $P_{threshold\ 2}$ is 0.2 and $P^{(i)}$ of the terminals 2003-1 to 2003-3 are respectively 0.3, 0.6, and 0.7, the base station may group the terminals 2003-1 to 2003-3 as the group 1 2003 and may allocate the same resources. In this case, since $P^{(G_m)}$ is 0.126, a channel blockage status value measured based on a group is lower than $P_{threshold\ 2}$. That is, the base station manages a corresponding terminal as a group together with other terminals, and thus even a terminal having a high channel blockage status may adjust a channel blockage status value to be low.

In addition, the base station may group terminals 2005-1 to 2005-3 as the group 2 2005. In this case, the base station may allocate orthogonal frequency resources for the groups 2003 to 2007. In addition, the base station may group terminals 2007-1 to 2007-4 as the group M 2007. In this case, the same resources are allocated to the terminals 2007-1 to 2007-4. Herein, the same resources may imply contention-based resources. Therefore, the terminals may resolve the contention through an LBT procedure, and may perform uplink transmission by occupying resources. That is, at least one terminal may occupy resources allocated to the terminals in the group through the contention resolution. As described above, if the base station determines groups based on the channel blockage status of the terminals, the base station may adjust the terminals included in the groups in terms of load balancing.

Figure 21:
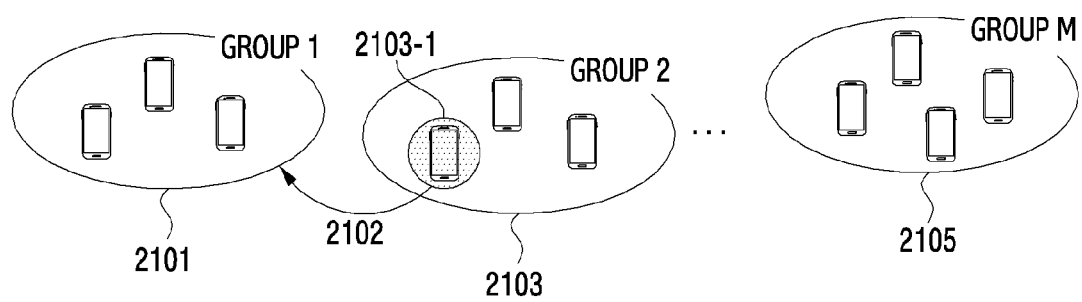
FIG. 21 illustrates an example of group adjustment of a base station in a wireless communication system according to various embodiments of the disclosure.

FIG. 21 illustrates an example of group adjustment of a base station in a wireless communication system according to various embodiments of the disclosure.

Referring to FIG. 21, it may be assumed that a group of terminals are configured in advance through the aforementioned procedure of FIG. 20. In this case, the base station may adjust terminals included in each group based on a channel blockage status in terms of load balancing. Herein, the adjusting may imply that the terminal changes a group to be scheduled to similarly maintain contention levels of terminals included in each group. In addition, the channel blockage status may indicate a channel blockage status P1 in a long-term, a channel blockage status Punpunc in an unpunctured resource, and a channel blockage status PCOTout measured in a duration not included in COT. For example, when groups 2101 to 2105 are configured, if a contention-based channel blockage status Pcontention of a terminal 2103-1 is higher than a specific threshold, the base station may adjust (see 2102) a group such that the terminal 2103-1 is included in a group 1 2101 having a relatively low contention level. In this case, the contention-based channel blockage status Pcontention may be defined as Equation 12 below.

$$P_{contention}^{(i)} = P_{unpunc}^{(i)} - P_{punc}^{(i)} \quad (12)$$

In Equation 12, $P_{contention}^{(i)}$ denotes a contention based channel blockage q status, $P_{unpunc}^{(i)}$ denotes a channel blockage status by an ith terminal in unpunctured resources, and $P_{punc}^{(i)}$ denotes a channel blockage status measured by the ith terminal in punctured resources. In this case, the unpunctured resources may be resources used in AUL transmission, and may be defined as overbooked uplink resources. In some embodiments, $P_{unpunc}^{(i)}$ may be a value including not only interference of Wi-Fi for a terminal but also interference caused by another terminal in a network in which the terminal is included. Therefore, $P_{contention}^{(i)}$ may be a channel blockage status considering interference of another terminal in a network to which a corresponding terminal belongs. If $P_{contention}^{(i)}$ is great, it may imply that there is severe contention between terminals to occupy resources in the overbooked uplink resources. Therefore, the base station may collect $P_{contention}^{(i)}$ from the terminals to adjust contention for resource occupancy.

Figure 22:
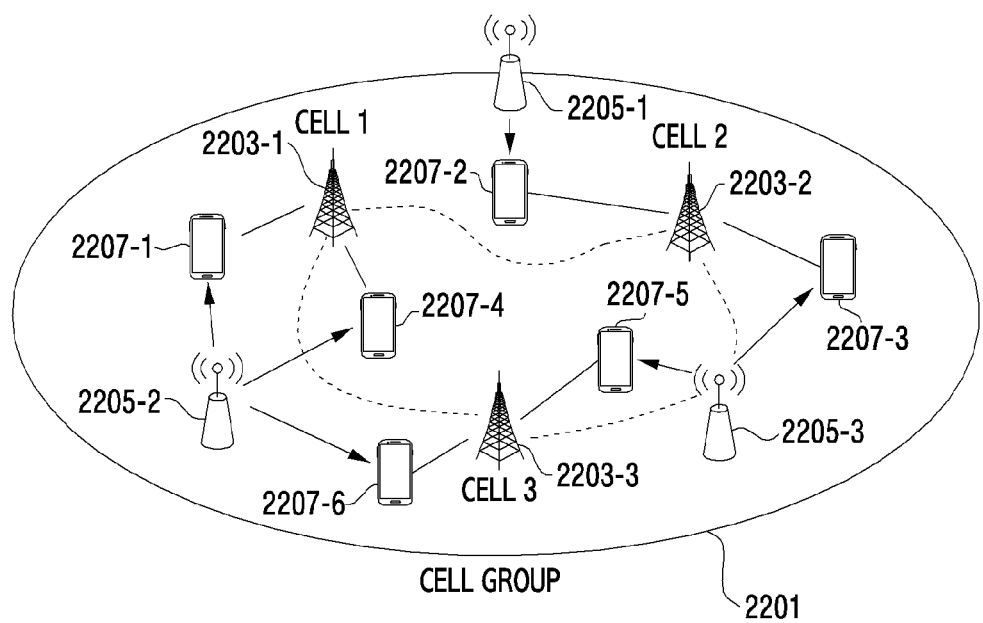
FIG. 22 illustrates an example of cell group-based scheduling of a base station in a wireless communication system according to various embodiments of the disclosure.

FIG. 22 illustrates an example of cell-group based scheduling of a base station in a wireless communication system according to various embodiments of the disclosure.

Referring to FIG. 22, a situation may be assumed in which adjacent cells 2203-1 to 2203-3 constitute a cell group 2201. In this case, the cells 2203-1 to 2203-3 may represent NR-U cells. In addition, a situation may be assumed in which all nodes included in the cell group 2201 share specific punctured resources. In this situation, the base stations may effectively allocate uplink resources for each of terminals in a cell group by utilizing a sum of total utilities of the entire terminals in the cell group and information regarding cells to maximize cell utilize efficiency. For example, when the cell 1 2203-1 serves terminals 2207-1 and 2207-4, the cell 2 2203-2 serves terminals 2207-2 and 2207-3, and the cell 3 2203-3 serves terminals 2207-5 and 2207-6, joint scheduling may be performed between the cells 2203-1 to 2203-3. That is, when nodes 2205-1 to 2205-3 can occupy a channel for each of the terminals, since the nodes 2205-1 to 2205-3 are included in the same cell group 2201, the cells 2203-1 to 2203-3 may measure a channel blockage status except for the aforementioned nodes. In this case, the measured channel blockage status may be a channel blockage status Pcellgroup in unit of cell groups. After measuring the channel blockage status, the base station may perform uplink resource scheduling for terminals in a cell group. Accordingly, the cells 2203-1 to 2203-3 may avoid channel blockage caused by a node included in the same cell group 2201. Hereinafter, FIG. 23 illustrates a flowchart of a base station for performing uplink resource scheduling described with reference to FIG. 17 to FIG. 22.

Figure 23:
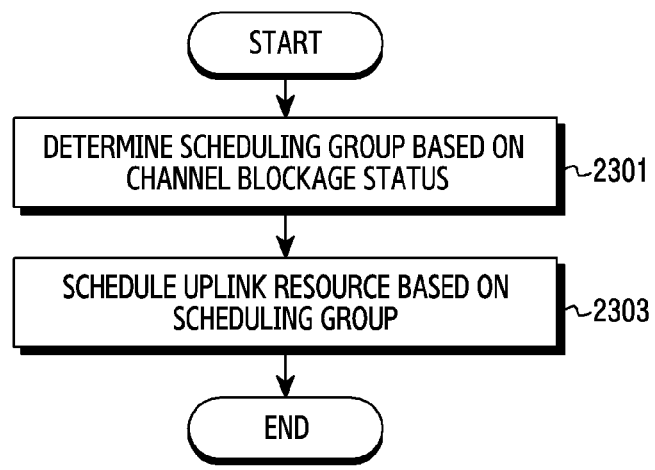
FIG. 23 is an exemplary flowchart of a base station for performing uplink resource scheduling based on a channel blockage status in a wireless communication system according to various embodiments of the disclosure.

FIG. 23 is a flowchart of a base station for performing uplink resource scheduling based on a channel blockage status in a wireless communication system according to various embodiments of the disclosure. A method of operating the base station 110 is exemplified in FIG. 23.

Referring to FIG. 23, in step 2301, the base station may determine a scheduling group based on the channel blockage status. For example, the base station may move terminals having a high channel blockage status from an unlicensed band to a licensed band. In addition, the base station may determine a transmission mode of the terminals based on the channel blockage status, and may determine a group of the terminals based on the transmission mode. In addition, the base station may determine the group of the terminals based on the channel blockage status to maximize resource utility efficiency of the terminals. In addition, the base station may determine a scheduling group in unit of cell groups in which a plurality of cells are included.

In step 2303, the base station may schedule uplink resources based on the scheduling group. For example, the base station may allocate the uplink resources for terminals included in the unlicensed band after unlicensed band de-attaching is performed. In addition, the base station may allocate the uplink resources for each group of terminals determined according to the transmission mode. In addition, the base station may perform group-based scheduling to maximize resource utility efficiency. In this case, orthogonal frequency resources may be allocated for each group, and the same resources, i.e., contention-based resources, may be allocated for terminals in the group. In addition, the uplink resources may be a time-frequency resources allocated semi-persistently.

According to the method described with reference to FIG. 4 to FIG. 23, the channel blockage status of the terminal may be measured, and thus the base station may schedule the uplink resources of the terminals. An overall procedure for measuring the channel blockage status is described below with reference to FIG. 23 based on the aforementioned aspects.

Figure 24:
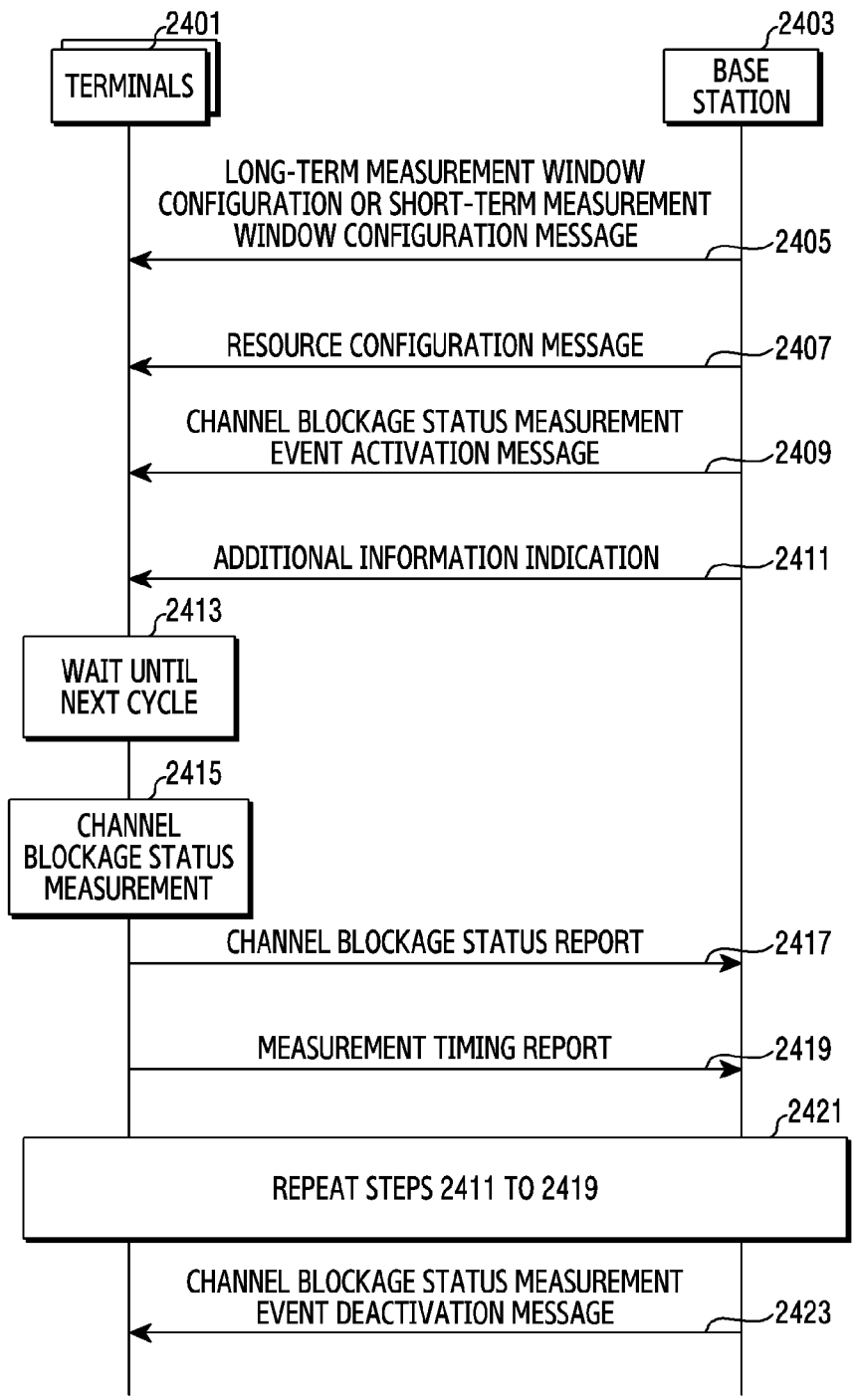
FIG. 24 illustrates an overall procedure for measuring a channel blockage status in a wireless communication system according to various embodiments of the disclosure.

FIG. 24 illustrates an exemplary overall procedure for measuring a channel blockage status in a wireless communication system according to various embodiments of the disclosure. A method of operating terminals 2401 and a base station 2403 is exemplified in FIG. 24. In this case, the terminal 2401 may correspond to the terminals 120, 123, and 126 of FIG. 1, and the base station 2403 may correspond to the base station 110.

Referring to FIG. 24, in step 2405, a base station transmits a message including a long-term measurement window configuration or a short-term measurement window configuration to terminals. In this case, the base station may transmit the message through RRC signaling. However, a message transmission scheme is not limited to the RRC signaling. Although it is not explicitly disclosed in FIG. 24, the base station may configure configuration information required to measure a channel blockage status of the terminals before performing step 2405. In this case, the configuration information may include information regarding each cell or each cell group, information regarding punctured resources or unpunctured resources, information regarding a measurement window for measuring a channel blockage status of a short-term, and information regarding a measurement window for measuring a channel blockage status of a long-term. For example, the information regarding the measurement window for measuring the channel blockage status of the short-term may include a short-term TW2 occupied by the measurement window, a time interval TCCA between slots included in the measurement window, and an interval TP2 between start points of each short-term. The information regarding the measurement window for measuring the channel blockage status of the long-term may include a long-term TW1 occupied by the measurement window. In addition, the base station may reconfigure the aforementioned configuration information.

In step 2407, the base station transmits a message for a resource configuration to the terminals. For example, the resource configuration may include punctured resources or unpunctured resources, resources in unit of a cell, and resources in unit of a cell group. The base station may transmit a position on a frequency domain of each resource to the terminals. In some embodiments, when the base station transmits information regarding the resources in unit of the cell group to the terminal, information regarding a measurement window for measuring a channel blockage status for each cell group may also be transmitted together. In this case, the base station may transmit a message for the aforementioned resource configuration through RRC signaling. However, a message transmission scheme is not limited to RRC signaling. Although not shown in FIG. 24, the base station may pre-configure the aforementioned resource.

In step 2409, the base station transmits a message for activating channel blockage status measurement to the terminals. That is, the base station may transmit a message for triggering each of the terminals to measure the channel blockage status through DCI. However, message transmission is not limited to the DCI, and thus in other embodiments, the message for activating the channel blockage status measurement may be transmitted from the base station to the terminals through a medium access control (MAC) control element (CE) or RRC message.

In step 2411, the base station indicates additional information. In this case, the additional information may include information regarding the channel blockage status measurement window activated for each of the terminals. For example, the information regarding the measurement window may include information regarding whether the measurement window is included in a COT of the base station and whether resources included in the measurement window are punctured resources or unpunctured resources. The base station may transmit a message indicating the additional information through the DCI. However, message transmission is not limited to the DCI, and thus in other embodiments, the message for activating the channel blockage status measurement may be transmitted from the base station to the terminals through a MAC CE or RRC message.

In step 2413, the terminals wait until a next cycle. That is, the terminals which have received the aforementioned information from the base station may wait instead of performing the channel blockage status measurement until a start point of a next channel blockage status measurement cycle.

In step 2415, the terminals measure a channel blockage status. That is, the terminals may measure the channel blockage status based on a variety of configuration information and additional information received from the base station. For example, the terminals may measure the channel blockage status in a long-term or a short-term, in punctured resources or unpunctured resources, in resources in unit of a cell or a cell group, and in a duration included in a COT or a duration not included in the COT. When the terminals receive the additional information in step 2411, the terminals may measure the channel blockage status by distinguishing each situation indicated by the additional information.

In step 2417, the terminals report the channel blockage status. That is, the terminals may report information regarding the channel blockage status measured based on the configuration information to the base station. However, the channel blockage status report is not limited to UCI, and the channel blockage status report performed by the terminal may be defined as L1 feedback. In some embodiments, when the terminals do not receive the additional information from the base station, the terminal may report only a channel blockage status P2 measured in the short-term to the base station. The base station may calculate and manage P1, P2, and P separately by using the reported P2. In some embodiments, aside from the L1 feedback of the terminals, if P1 measured by the terminals satisfies a condition of triggering a specific event, the terminals may report P1 to the base station through an L3 message corresponding to an RRC message of the base station. In this case, the L3 message may include UE-capability information, RRC-configuration information, or the like.

In step 2419, the terminals report measurement timings. That is, the terminals may report information regarding measurement timings at which the channel blockage status reported in step 2417 to the base station through UCI. However, the measurement timing report is not limited to the UCI. In some embodiments, when the base station indicates the additional information through step 2411, the terminals may skip step 2419.

In step 2421, the terminals and the base station may repeat steps 2411 to 2419. Accordingly, the base station may collect information regarding the channel blockage status of the terminal in various situations.

In step 2423, the base station transmits a message for deactivating a channel blockage status measurement event to the terminals. That is, the base station transmits a message for triggering the stop of measuring the channel blockage status of the terminals to the terminals through DCI. However, message transmission is not limited to the DCI, and thus in other embodiments, the message for activating the channel blockage status measurement may be transmitted from the base station to the terminals through a MAC CE or RRC message.

Although it is not explicitly disclosed in FIG. 24, upon failure in receiving the configuration information regarding the measurement window of the long-term from the base station in step 2405, the terminal may measure only a channel blockage status P2 for the short-term. In this case, the channel blockage status P is P2. However, if the terminals have received all of the configuration information regarding the measurement window of the short-term and the configuration information regarding the measurement window of the long-term, the terminals may measure all of the channel blockage status P2 for the short-term and the channel blockage status P1 for the long-term. The terminals or the base station may determine a representative value P of the channel blockage status by using P1 and P2.

Referring to FIG. 1 to FIG. 24 described above, apparatus and methods according to various embodiments of the disclosure can measure a channel blockage status based on configuration information configured by a base station, and can effectively allocate an uplink resource of a terminal based on the measured channel blockage status.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclo-

What is claimed is:

1. A method performed by a base station in a wireless communication system, the method comprising:
transmitting, to a terminal, configuration information for measuring a channel blockage status indicating a degree by which an unlicensed band is occupied by an interference node;
receiving information regarding the channel blockage status measured based on the configuration information;
determining a channel blockage status in association with interference of a different terminal in a network to which the terminal belongs, based on the channel blockage status measured in punctured resources and the channel blockage status measured in unpunctured resources in the unlicensed band;
adjusting a number of terminals belonging to scheduling groups based on the channel blockage status in association with the interference of the different terminal, the scheduling groups comprising a plurality of terminals;
transmitting, to the terminal, scheduling information on uplink resources generated based on the channel blockage status; and
receiving data from the terminal based on the scheduling information,
wherein the configuration information includes at least one of: information regarding a measurement duration for measuring the channel blockage status, information on uplink resources allocated to measure the channel blockage status, or information regarding a channel occupancy time (COT) of the base station.

2. The method of claim 1, further comprising:
adjusting at least one terminal served in the unlicensed band so as to be served in a licensed band, based on the measured channel blockage status; and
allocating uplink resources for a plurality of terminals belonging to the unlicensed band,
wherein the measured channel blockage status comprises a channel blockage status measured in a long-term.

3. The method of claim 1, further comprising:
determining a scheme by which the terminal transmits data to the base station, based on the measured channel blockage status;
determining a scheduling group corresponding to the scheme; and
allocating uplink resources for a plurality of terminals belonging to the scheduling group,
wherein the scheme comprises a scheduled uplink (SUL) scheme or an autonomous uplink (AUL) scheme, and
wherein the measured channel blockage status comprises at least one of a channel blockage status measured in a long-term and a channel blockage status measured based on the COT.

4. The method of claim 1, further comprising:
determining scheduling groups comprising a plurality of terminals or a plurality of cells based on the measured channel blockage status; and
allocating uplink resources for terminals belonging to the scheduling groups,
wherein the measured channel blockage status comprises at least one of a channel blockage status measured in a long-term, a channel blockage status measured in punctured resources, and a channel blockage status measured in a duration not included in the COT.

5. A base station in a wireless communication system, the base station comprising:
a transceiver; and
at least one processor configured to:
transmit, to a terminal, configuration information for measuring a channel blockage status indicating a degree by which an unlicensed band is occupied by an interference node,
receive information regarding the channel blockage status measured based on the configuration information,
determine a channel blockage status in association with interference of a different terminal in a network to which the terminal belongs, based on the channel blockage status measured in punctured resources and the channel blockage status measured in unpunctured resources in the unlicensed band,
adjust a number of terminals belonging to scheduling groups based on the channel blockage status in association with the interference of the different terminal, the scheduling groups comprising a plurality of terminals,
transmit, to the terminal, scheduling information on an uplink resource generated based on the information regarding the channel blockage status, and
receive data from the terminal based on the scheduling information, wherein the configuration information includes at least one of: information regarding a measurement duration for measuring the channel blockage status, information on an uplink resource allocated to measure the channel blockage status, or information regarding a channel occupancy time (COT) of the base station.

6. The base station of claim 5, wherein the at least one processor is configured to:
adjust at least one terminal served in the unlicensed band so as to be served in a licensed band, based on the measured channel blockage status; and
allocate uplink resources for a plurality of terminals belonging to the unlicensed band,
wherein the measured channel blockage status comprises a channel blockage status measured in a long-term.

7. The base station of claim 5, wherein the at least one processor is configured to:
determine a scheme by which the terminal transmits data to the base station, based on the measured channel blockage status;
determine a scheduling group corresponding to the scheme; and
allocate uplink resources for a plurality of terminals belonging to the scheduling group,
wherein the scheme comprises a scheduled uplink (SUL) scheme or an autonomous uplink (AUL) scheme, and
wherein the measured channel blockage status comprises at least one of a channel blockage status measured in a long-term and a channel blockage status measured based on the COT.

8. The base station of claim 5, wherein the at least one processor is configured to:
determine scheduling groups comprising a plurality of terminals or a plurality of cells based on the measured channel blockage status; and
allocate uplink resources for terminals belonging to the scheduling groups, wherein the measured channel blockage status comprises at least one of a channel blockage status measured in a long-term, a channel blockage status measured in punctured resources, and a channel blockage status measured in a duration not included in the COT.

* * * * *